(12) United States Patent
Yasuoka

(10) Patent No.: US 10,432,802 B2
(45) Date of Patent: Oct. 1, 2019

(54) TERMINAL DEVICE, AND NON-TRANSITORY COMPUTER READABLE MEDIUM STORING PROGRAM FOR TERMINAL DEVICE

(71) Applicant: FUJI XEROX CO., LTD., Tokyo (JP)

(72) Inventor: Daisuke Yasuoka, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/001,431

(22) Filed: Jun. 6, 2018

(65) Prior Publication Data
US 2018/0288242 A1     Oct. 4, 2018

Related U.S. Application Data

(63) Continuation of application No. 15/217,034, filed on Jul. 22, 2016, now Pat. No. 10,009,484.

(30) Foreign Application Priority Data

Mar. 14, 2016   (JP) ................. 2016-049407

(51) Int. Cl.
*H04N 1/00*     (2006.01)
*H04N 5/232*    (2006.01)
*G06F 3/12*      (2006.01)

(52) U.S. Cl.
CPC ....... *H04N 1/00204* (2013.01); *G06F 3/1204* (2013.01); *G06F 3/1224* (2013.01);
(Continued)

(58) Field of Classification Search
CPC .......... H04N 1/00204; H04N 1/00278; H04N 5/23293; G06F 3/1204; G06F 3/1292; G06F 3/1224; G06F 3/1253
See application file for complete search history.

(56) References Cited

U.S. PATENT DOCUMENTS

| | | | |
|---|---|---|---|
| 6,947,075 B1 * | 9/2005 | Niikawa | H04N 1/00347 348/207.1 |
| 2003/0210331 A1 * | 11/2003 | Battles | H04N 1/00509 348/211.2 |

(Continued)

FOREIGN PATENT DOCUMENTS

| | | |
|---|---|---|
| JP | 2014-219822 A | 11/2014 |
| JP | 2015-146173 A | 8/2015 |
| WO | 2015-030786 A1 | 3/2015 |

OTHER PUBLICATIONS

Aug. 9, 2017 Search Report issued in European Patent Application No. 16185204.1.

(Continued)

*Primary Examiner* — Shahbaz Nazrul
(74) *Attorney, Agent, or Firm* — Oliff PLC

(57) ABSTRACT

There is provided a terminal device. An image acquiring unit acquires a processing apparatus image serving as an image of a data processing apparatus. A display unit displays a request screen used for requesting a data processing apparatus to process data. At least one of processing apparatus images acquired by the image acquiring unit and at least one of data images indicating data that is requested to be processed are displayed on the request screen. In response to an operation of an operator of designating one of the processing apparatus images and one of the data images on the request screen, a request for processing the data indicated by the designated data image is transmitted to the data processing apparatus indicated by the designated processing apparatus image.

7 Claims, 24 Drawing Sheets

(52) U.S. Cl.
CPC .......... *G06F 3/1253* (2013.01); *G06F 3/1292* (2013.01); *H04N 1/00278* (2013.01); *H04N 5/23293* (2013.01)

(56) References Cited

U.S. PATENT DOCUMENTS

| | | | | |
|---|---|---|---|---|
| 2008/0307364 | A1* | 12/2008 | Chaudhri | G06F 3/0483 715/836 |
| 2011/0037712 | A1* | 2/2011 | Kim | H04M 1/7253 345/173 |
| 2012/0019858 | A1* | 1/2012 | Sato | H04N 1/00344 358/1.15 |
| 2012/0092715 | A1* | 4/2012 | Kamei | G06F 3/04886 358/1.15 |
| 2012/0182432 | A1* | 7/2012 | Okamoto | G06F 3/1204 348/207.1 |
| 2013/0267309 | A1* | 10/2013 | Robbins | A63F 9/24 463/31 |
| 2014/0253744 | A1* | 9/2014 | Nitta | G06F 3/1261 348/207.2 |
| 2015/0062629 | A1* | 3/2015 | Tamura | H04N 1/00307 358/1.15 |
| 2015/0185975 | A1* | 7/2015 | Hasegawa | G06F 3/0482 715/765 |
| 2015/0206479 | A1* | 7/2015 | Maeda | G09G 3/344 345/107 |
| 2016/0217617 | A1* | 7/2016 | Barribeau | G06F 3/04815 |

OTHER PUBLICATIONS

Sep. 21, 2017 Office Action issued in U.S. Appl. No. 15/217,034.
Mar. 2, 2018 Notice of Allowance issued in U.S. Appl. No. 15/217,034.

* cited by examiner

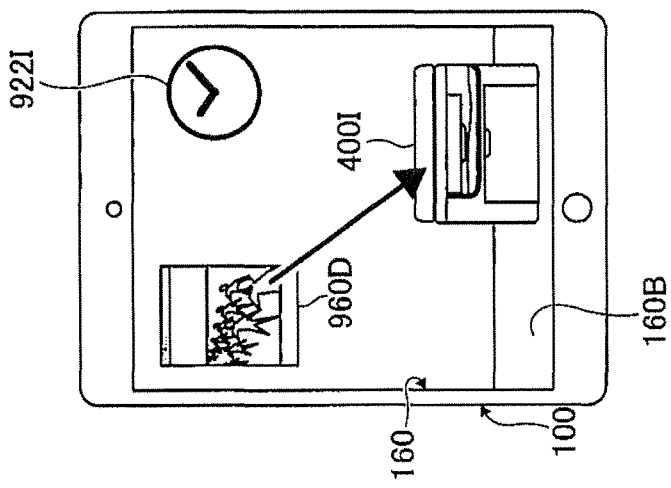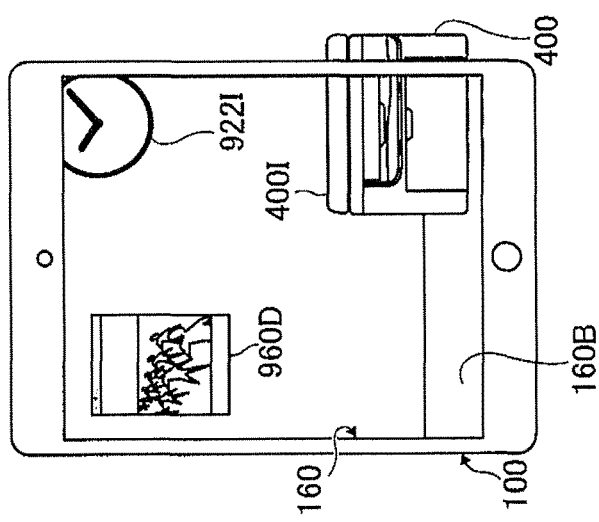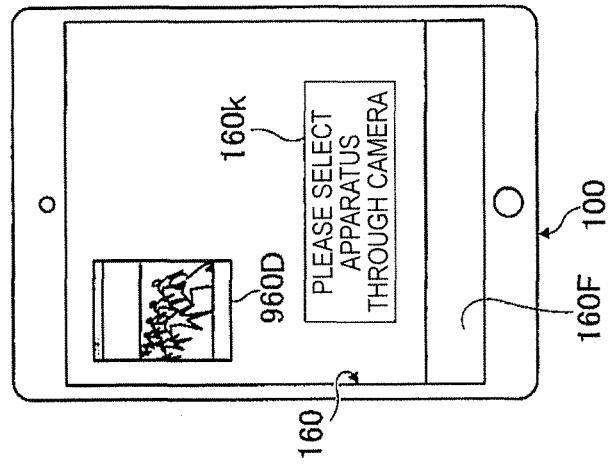

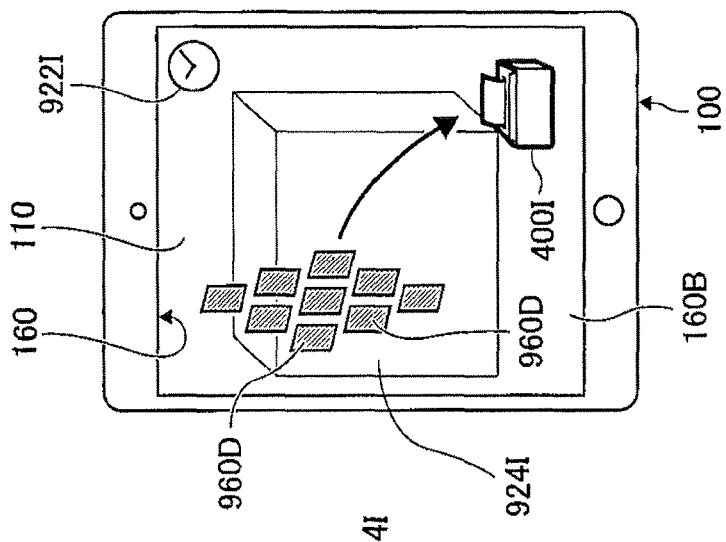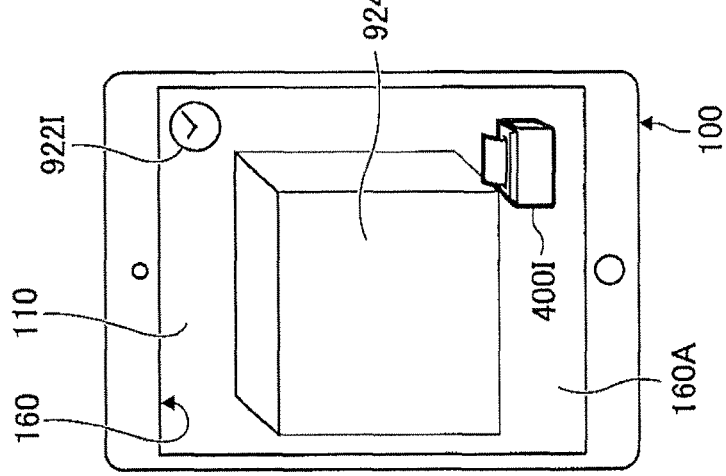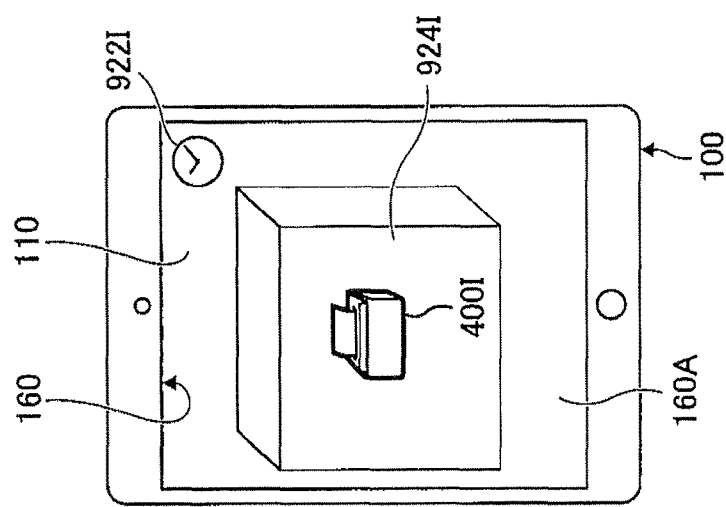

TERMINAL DEVICE, AND NON-TRANSITORY COMPUTER READABLE MEDIUM STORING PROGRAM FOR TERMINAL DEVICE

CROSS-REFERENCE TO RELATED APPLICATIONS

This application is a continuation of U.S. application Ser. No. 15/217,034 filed Jul. 22, 2016, which is based on and claims priority under 35 U.S.C. 119 from Japanese Patent Application No. 2016-049407 filed with the Japan Patent Office on Mar. 14, 2016, the entire content of which is hereby incorporated by reference.

TECHNICAL FIELD

The present invention relates to a terminal device, a data processing system, a non-transitory computer readable medium and a data processing method.

RELATED ART

When a terminal device transmits a data processing request to a data processing apparatus, it is necessary to acquire an address of the data processing apparatus on a network and establish a connection between the terminal device and the data processing apparatus. However, there are cases in which an operation of connecting the terminal device with the data processing apparatus is complicated.

SUMMARY

According to an aspect of the embodiments of the present invention, there is provided a terminal device, comprising: an image acquiring unit that acquires a processing apparatus image serving as an image of a data processing apparatus; and a display unit that displays a request screen used for requesting a data processing apparatus to process data, wherein at least one of processing apparatus images acquired by the image acquiring unit and at least one of data images indicating data that is requested to be processed are displayed on the request screen, and wherein in response to an operation of an operator of designating one of the processing apparatus images and one of the data images on the request screen, a request for processing the data indicated by the designated data image is transmitted to the data processing apparatus indicated by the designated processing apparatus image.

BRIEF DESCRIPTION OF THE DRAWINGS

Exemplary embodiments of the present invention will be described in detailed based on the following figures, wherein:

FIG. 13A is a diagram illustrating an example of a data display screen displayed on a display unit of a terminal device, FIG. 13B is a diagram illustrating a third example of the request screen displayed on the display unit of the terminal device, and FIG. 13C is a diagram for describing an operation of requesting a data processing apparatus to process data on the request screen illustrated in FIG. 13B;

FIGS. 15A and 15B are diagrams illustrating examples of a processing apparatus display screen displayed on a display unit of a terminal device, and FIG. 15C is a diagram illustrating a request screen displayed on the display unit after FIG. 15B is displayed;

DETAILED DESCRIPTION

First Exemplary Embodiment

Figure 1:
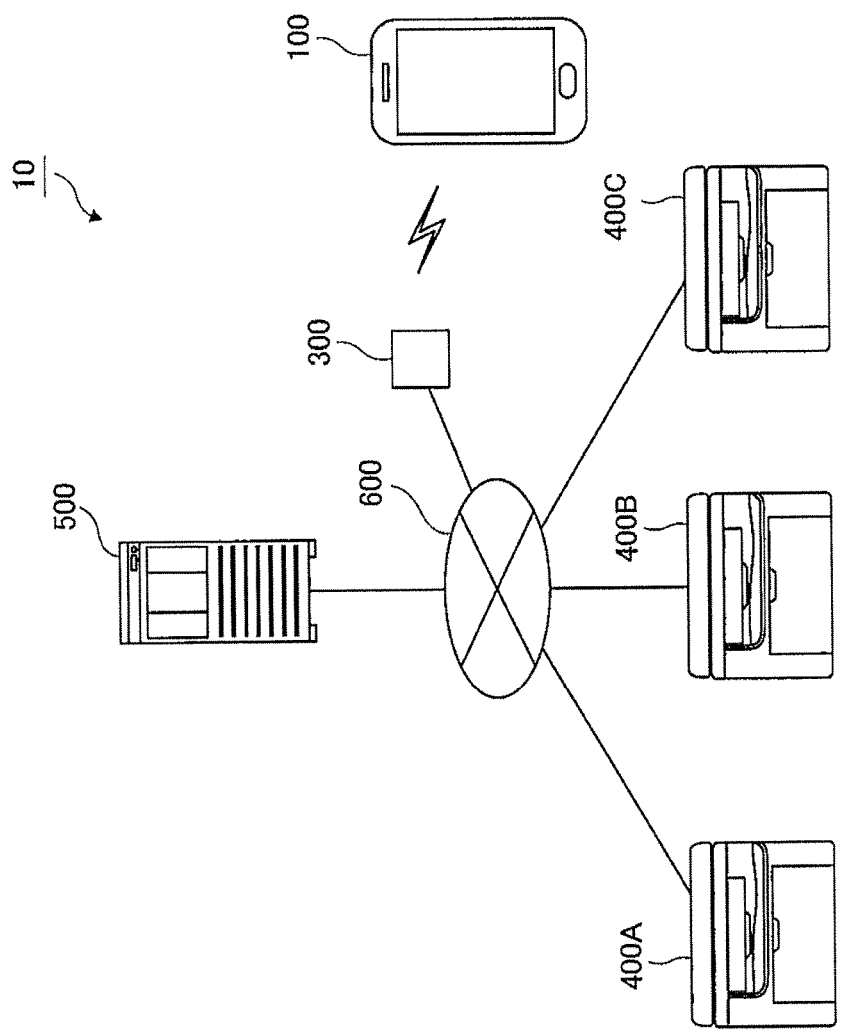
FIG. 1 is a diagram illustrating a data processing system according to a first exemplary embodiment of the present invention.

Hereinafter, embodiments for carrying out the present invention will be described with reference to the appended drawings. FIG. 1 illustrates a data processing system 10 according to a first exemplary embodiment of the present invention. The data processing system 10 includes a terminal device 100, a wireless communication apparatus 300, for example, three data processing apparatuses 400A, 400B, and 400C, and a management apparatus 500 which are connected to a network 600.

The data processing apparatus 400A, the data processing apparatus 400B, and the data processing apparatus 400C are hereinafter referred to collectively as a "data processing apparatus 400" when they need not be particularly distinguished from one another. The following description will proceed with an example in which the data processing system 10 includes the three data processing apparatuses 400, but the data processing system 10 preferably includes at least one data processing apparatus 400.

The terminal device 100 is preferably a portable apparatus, and for example, a smart phone, a tablet apparatus, a wearable computer, or the like may be used. The terminal device 100 is preferably connected to the network 600 through the wireless communication apparatus 300 in a wireless manner but may be connected to the network 600 in a wired manner. The following description will proceed with an example in which a smart phone serving as a portable apparatus connectable to the network 600 through the wireless communication apparatus 300 is used as the terminal device 100.

Figure 2:
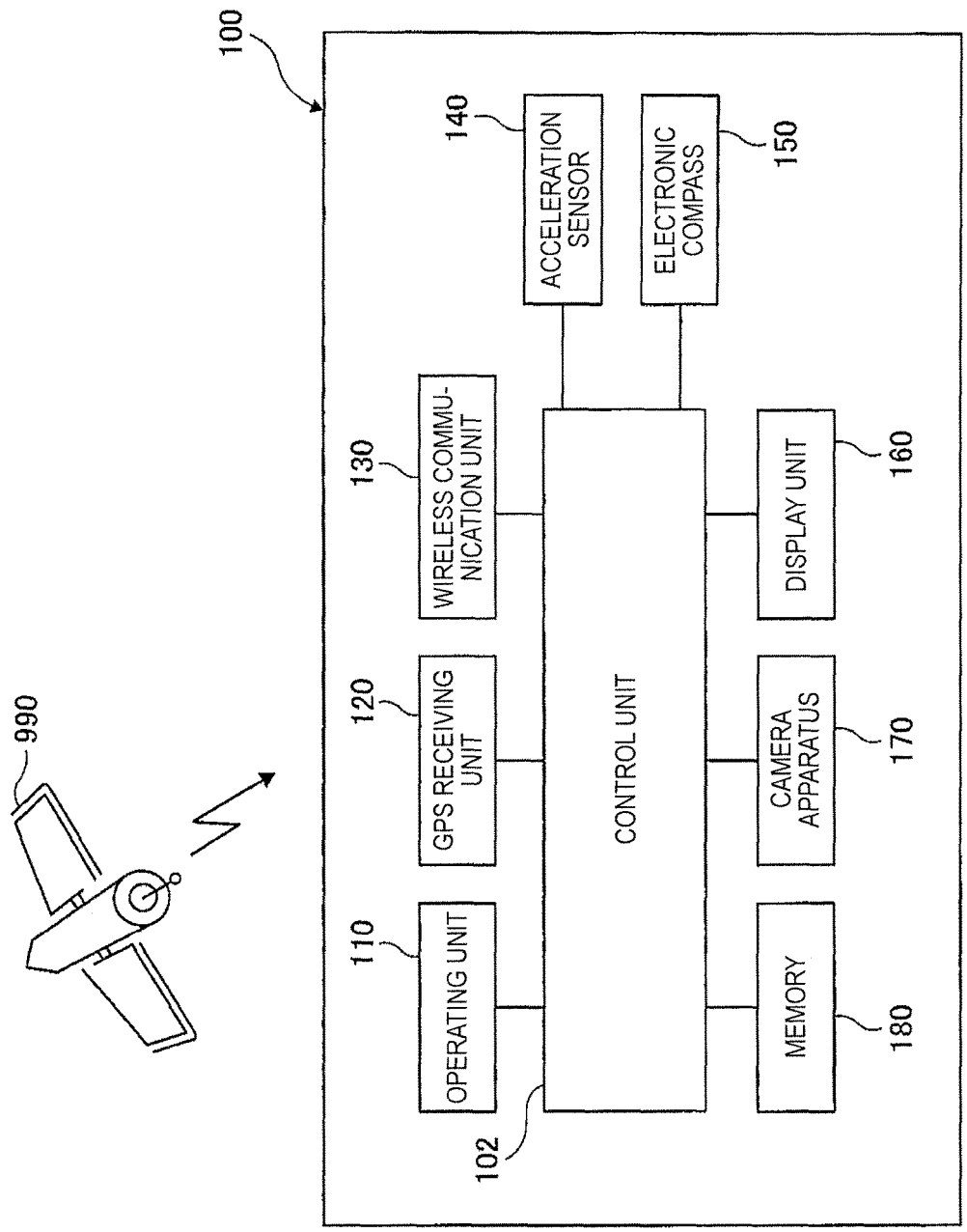
FIG. 2 is a block diagram illustrating a configuration of a terminal device included in the data processing system illustrated in FIG. 1.

FIG. 2 is a block diagram illustrating a configuration of the terminal device 100. As illustrated in FIG. 2, the terminal device 100 includes an operating unit 110. The operating unit 110 is used as an input apparatus that receives an instruction of an operator according to an operation of the operator, and for example, a touch panel or the like may be used.

The terminal device 100 further includes a global positioning system (GPS) receiving unit 120. The GPS receiving unit 120 receives radio waves from GPS satellites 990.

The terminal device 100 further includes a wireless communication unit 130. The wireless communication unit 130 connects the terminal device 100 with the network 600 by performing communication of a wireless network such as Wi-Fi and performing wireless communication with the wireless communication apparatus 300.

The terminal device 100 further includes an acceleration sensor 140. The acceleration sensor 140 detects a posture and an inclination of the terminal device 100 with respect to the ground surface. The acceleration sensor 140 further detects whether or not a vertical direction of the terminal device 100 with respect to the ground surface is right.

The terminal device 100 further includes an electronic compass 150. The electronic compass 150 detects a direction of the terminal device 100. For example, a geomagnetic sensor or the like may be used as the electronic compass 150.

The terminal device 100 further includes a display unit 160. For example, a liquid crystal display (LCD) panel may be used as the display unit 160.

The terminal device 100 further includes a camera apparatus 170. The camera apparatus 170 is used as both an image acquiring unit and a photographing apparatus, and photographs a subject, for example, using the display unit 160 as a finder.

The terminal device 100 further includes a memory 180. The memory 180 stores, for example, image data photographed by the camera apparatus 170.

The terminal device 100 further includes a control unit 102. The control unit 102 controls the operating unit 110, the GPS receiving unit 120, the wireless communication unit 130, the acceleration sensor 140, the electronic compass 150, the display unit 160, the camera apparatus 170, and the memory 180 according to a program. The control unit 102 further performs image processing.

The control unit 102 further calculates the position of the terminal device 100 on earth based on a radio wave that is transmitted from the GPS satellite 990 and received by the GPS receiving unit 120. As described above, the control unit 102 obtains latitude and longitude position coordinates of the terminal device 100 and acquires position information of the terminal device 100.

The position information of the terminal device 100 may be acquired by a method other than a method of acquiring GPS radio waves. For example, the position information of the terminal device 100 may be acquired by Wi-Fi positioning using a wireless LAN. Thus, even when the terminal device 100 does not include the GPS receiving unit 120, it is possible to acquire the position information of the terminal device 100 through plural wireless LAN access points.

Figure 3:
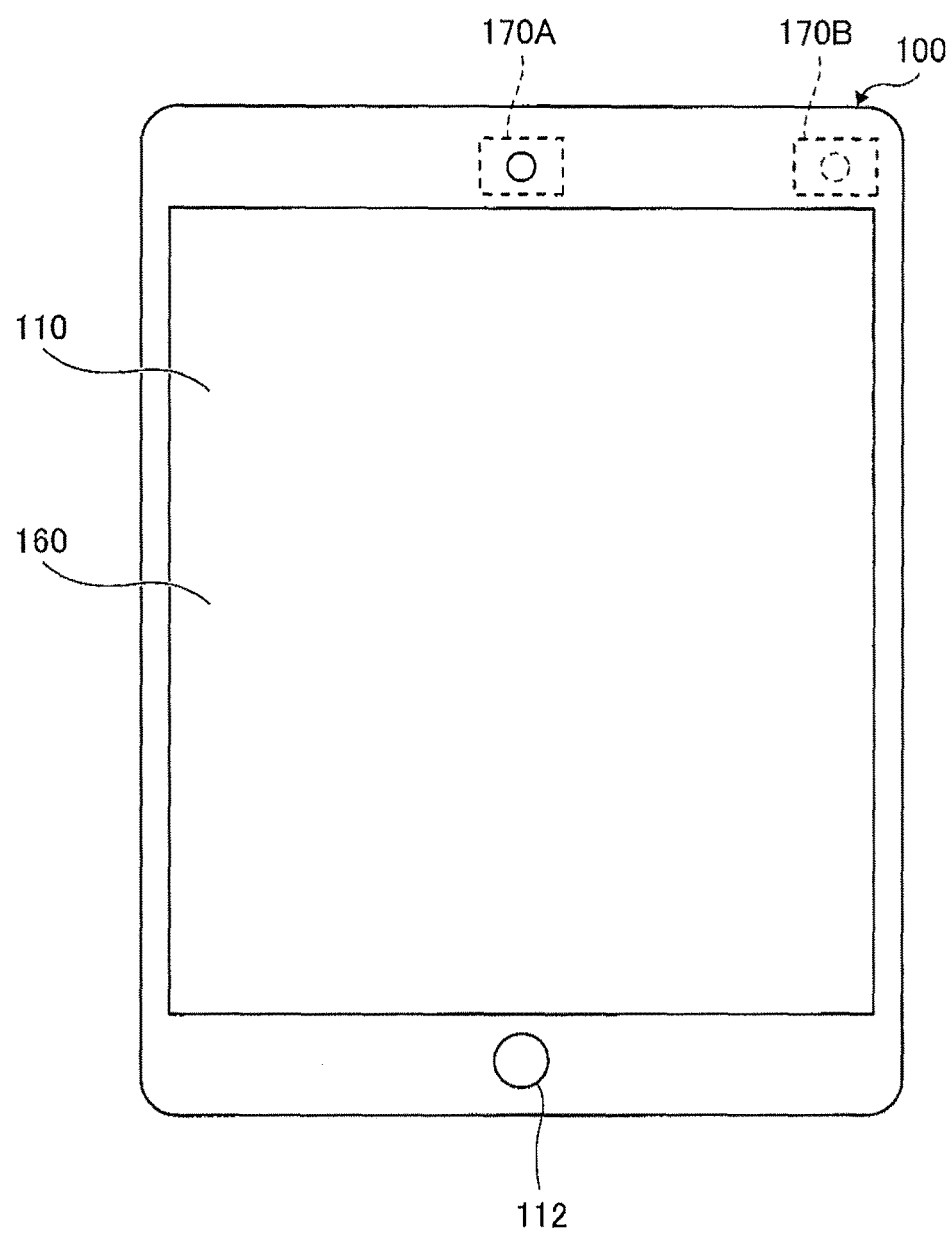
FIG. 3 is a front view illustrating a smart phone as an example of the terminal device illustrated in FIG. 2.

FIG. 3 is a diagram illustrating the terminal device 100 at a front view. As illustrated in FIG. 3, the display unit 160 is arranged on the front side of the terminal device 100 so that display content can be viewed from the front side of the terminal device 100. The operating unit 110 is arranged on the front side of the terminal device 100, similarly to the display unit 160 so that an operation can be performed on the front side.

The terminal device 100 includes, as the camera apparatus 170, a camera apparatus 170A that photographs an area in front of the terminal device 100 and a camera apparatus 170B that photographs an area behind the terminal device 100. The camera apparatus 170A and the camera apparatus 170B are referred to collectively as a "camera apparatus 170" unless they need not be particularly distinguished from each other.

The terminal device 100 further includes an auxiliary operating unit 112. The auxiliary operating unit 112 assists an operation performed by the operating unit 110 and is arranged, for example, on the front side of the terminal device 100. For example, a push button type switch apparatus may be used as the auxiliary operating unit 112.

Figure 4:
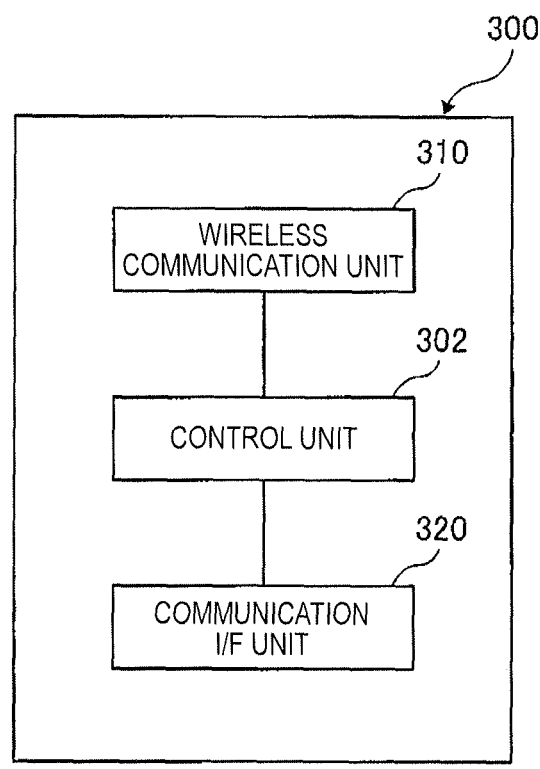
FIG. 4 is a block diagram illustrating a configuration of a wireless communication apparatus included in the data processing system illustrated in FIG. 1.

FIG. 4 is a block diagram illustrating a configuration of the wireless communication apparatus 300. The wireless communication apparatus 300 functions as a wireless communication access point, and includes a wireless communication unit 310, a communication interface (I/F) unit 320, and a control unit 302 as illustrated in FIG. 4. The wireless communication unit 310 performs wireless communication with the terminal device 100. The communication I/F unit 320 connects the wireless communication apparatus 300 to the network 600 so that communication can be performed. The control unit 302 controls the wireless communication unit 310 and the communication I/F unit 320.

Figure 5:
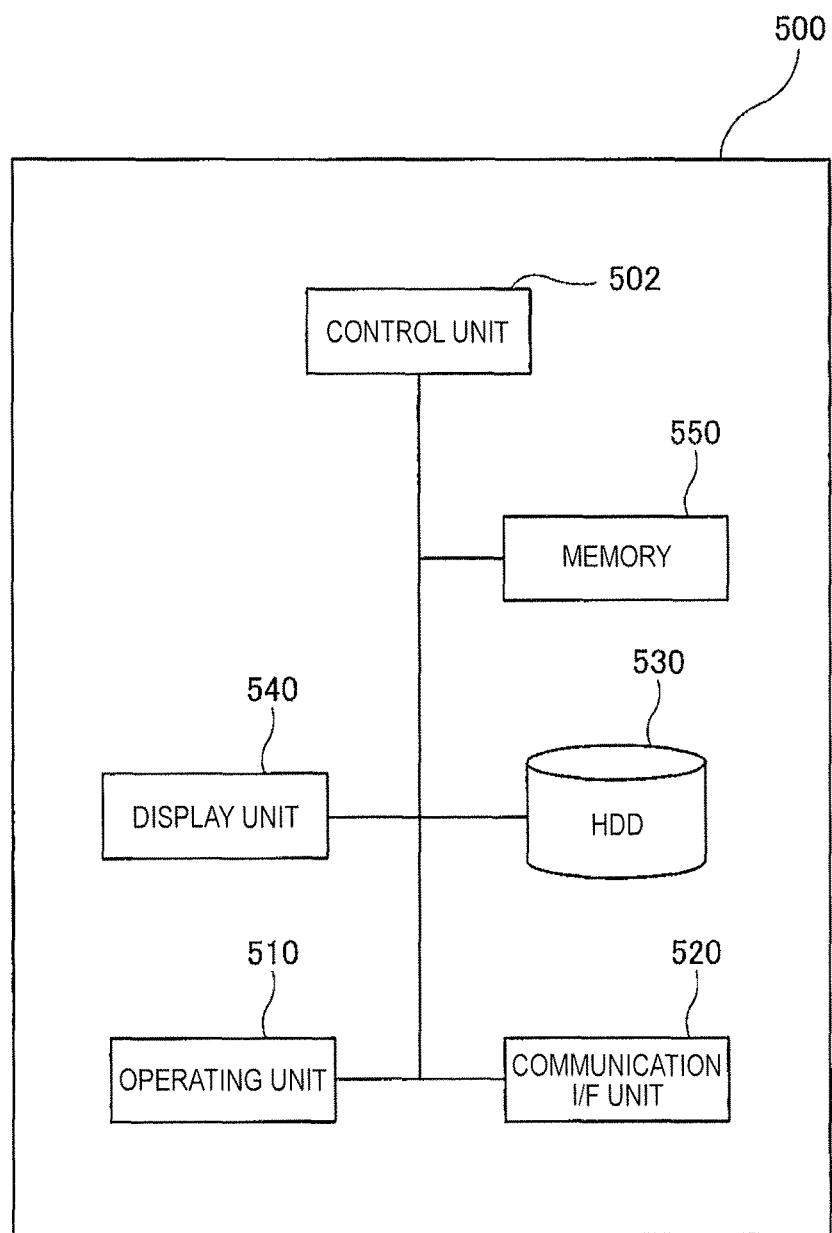
FIG. 5 is a block diagram illustrating a configuration of a management apparatus included in the data processing system illustrated in FIG. 1.

FIG. 5 is a block diagram illustrating a configuration of the management apparatus 500. The management apparatus 500 is an apparatus that centrally manages the data processing apparatuses 400 connected to the network 600, and includes an operating unit 510 as illustrated in FIG. 5. The operating unit 510 is used to operate the management apparatus 500, and for example, a keyboard or the like may be used as the operating unit 510.

The management apparatus 500 further includes a communication I/F unit 520. The communication I/F unit 520 connects the management apparatus 500 to the network 600 so that communication can be performed. The management apparatus 500 further includes a storage unit 530, a display unit 540 such as a monitor, a memory 550, and a control unit 502 that controls the storage unit 530, the display unit 540, and the memory 550.

For example, a hard disk drive (HDD) may be used as the storage unit 530. The storage unit 530 stores position information of each of the data processing apparatuses 400, shape information of each of the data processing apparatuses 400, a communication protocol that can be used for communication by each of the data processing apparatuses 400, and identification information of each of the data processing apparatuses 400 in a database thereof so that the information can be read by the control unit 502. Here, examples of the position information of the data processing apparatus 400 include latitude and longitude position coordinates that can be acquired by a GPS, position coordinates acquired by Wi-Fi positioning, and position coordinates obtained by an indoor messaging system (IMES).

As the position information of the data processing apparatus 400, a result measured when each information processing apparatus is installed is stored in the storage unit 530. The data processing apparatus 400 may have a function of measuring a position, and the position of the data processing apparatus 400 measured by the data processing apparatus 400 may be, for example, automatically, stored in the storage unit 530 via the network 600.

As the identification information of the data processing apparatus 400, an address on the network 600 may be used, and an ID, an IP address, or the like of the data processing apparatus 400 in the network 600 may be further used.

Figure 6:
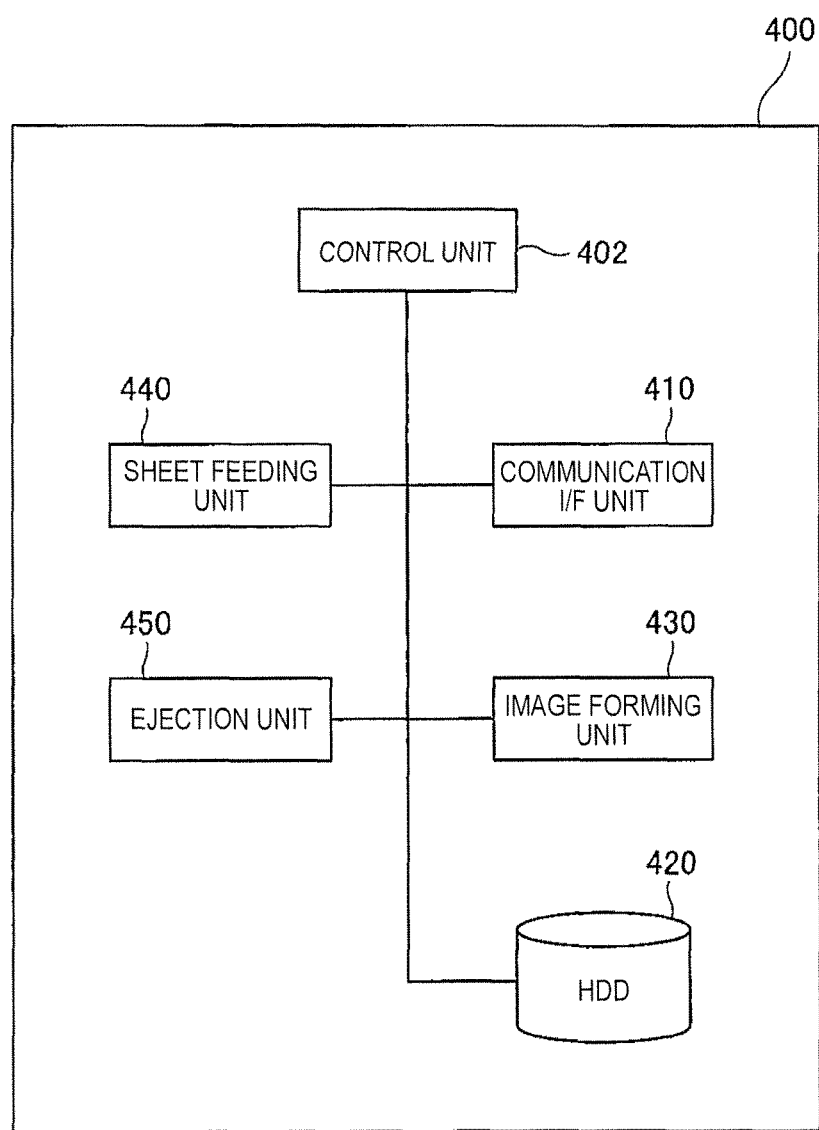
FIG. 6 is a block diagram illustrating a configuration of an information processing apparatus included in the data processing system illustrated in FIG. 1.

FIG. 6 is a block diagram illustrating a configuration of the data processing apparatus 400. The data processing apparatus 400 is an apparatus that processes data based on a request from the terminal device 100. The following description will proceed with an example in which an image forming apparatus serving as an apparatus performing a process of forming an image from data based on the request from the terminal device 100 is used as each of the data processing apparatuses 400A, 400B, and 400C, but the present invention is not limited to the image forming apparatus, and any apparatus that processes information such as data based on the request from the terminal device 100 can be used as the information processing apparatus.

For example, a projector, a display, or the like serving as an apparatus that processes data, which outputs image data, based on the request from the terminal device 100 may be used as the data processing apparatus 400. For example, an original reading apparatus (scanner) serving as an apparatus that processes data, which reads an image and transmits read image data, for example, to the terminal device 100 or the like, based on the request from the terminal device 100 may be used as the data processing apparatus 400. Further, for example, a personal computer that can perform various processes, for example, data transmitted from the terminal device 100 based on the request from the terminal device 100 may be used as the data processing apparatus 400.

The following description will proceed with an example in which the data processing apparatuses 400A, 400B, and 400C are image forming apparatuses serving as the same type of apparatuses that perform the same process, but the plural data processing apparatuses 400 connected to the network 600 may be different types of apparatuses that perform different processes on information. For example, the data processing apparatus 400A may be an image forming apparatus, the data processing apparatus 400B may be a projector, and the data processing apparatus 400C may be a personal computer.

As illustrated in FIG. 6, the data processing apparatus 400 includes a communication I/F unit 410, and the communication I/F unit 410 connects the data processing apparatus 400 to the network 600 so that communication can be performed. The data processing apparatus 400 further includes a storage unit 420. For example, a HDD may be used as the storage unit 420.

The data processing apparatus 400 further includes a sheet feeding unit 440, an image forming unit 430, and an ejection unit 450. The sheet feeding unit 440 supplies a sheet to the image forming unit 430, the image forming unit 430 forms an image on the supplied sheet, and the ejection unit 450 ejects the sheet on which the image is formed to the outside of the data processing apparatus 400.

The data processing apparatus 400 further includes a control unit 402. The control unit 402 controls the communication I/F unit 410, the storage unit 420, the image forming unit 430, the sheet feeding unit 440, and the ejection unit 450.

Figure 7A:
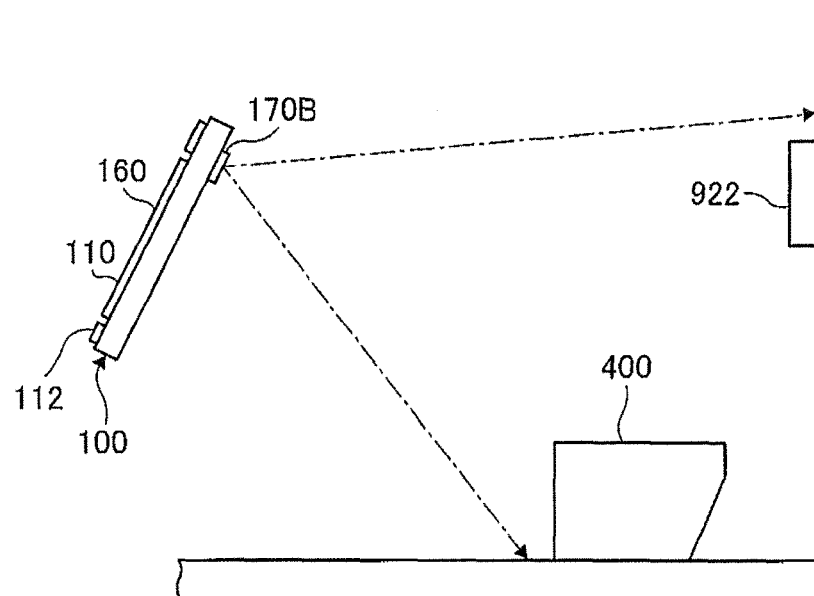
FIG. 7A is a diagram schematically illustrating an aspect of photographing a data processing apparatus through a terminal device in order to acquire a processing apparatus image.

FIG. 7A is a diagram schematically illustrating a first example of an operation of acquiring a processing apparatus image 400I serving as an image of the data processing apparatus 400 through the terminal device 100 and schematically illustrates a state in which the data processing apparatus 400 is photographed by the terminal device 100. As illustrated in FIG. 7A, in order to photograph the terminal device 100, for example, an operation of pointing a camera apparatus 170B arranged on an opposite side to the operating unit 110 and the display unit 160 of the terminal device 100 at the data processing apparatus 400 and then pushing, for example, the auxiliary operating unit 112 is performed. In FIG. 7A, a clock 922 hangs on a wall surface behind the side on which the data processing apparatus 400 is installed.

Figure 7B:
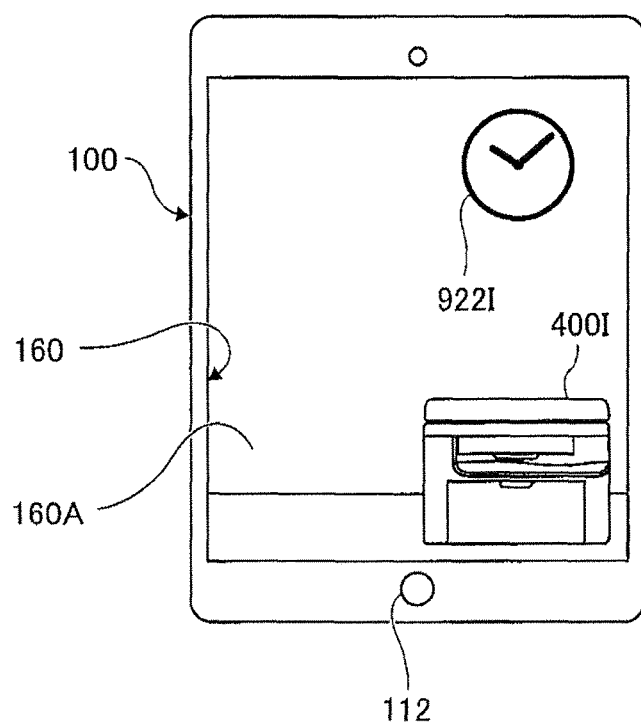
FIG. 7B is a diagram illustrating a state in which the processing apparatus image of the photographed data processing apparatus is displayed on a display unit of the terminal device.

FIG. 7B illustrates a photograph captured by photographing the data processing apparatus 400 as illustrated in FIG. 7A. The photograph is displayed on the display unit 160, and the processing apparatus image 400I serving as the image of the data processing apparatus 400 and a clock image 922I serving as an image of the clock are shown on the photograph. As described above, in the terminal device 100, the camera apparatus 170B is used as both the photographing apparatus and the image acquiring unit that acquires the processing apparatus image 400I.

Hereinafter, a screen on which the processing apparatus image 400I is displayed on the display unit 160 as illustrated in FIG. 7B is referred to as a "processing apparatus display screen 160A." The processing apparatus image 400I displayed on the processing apparatus display screen 160A is preferably an image capable of specifying one data processing apparatus 400 and need not be necessarily an image obtained by photographing the camera apparatus 170. More specifically, the processing apparatus image 400I may be a photograph of the data processing apparatus 400 that is photographed in advance and stored, for example, in a database installed in the storage unit 530 (see FIG. 5). The processing apparatus image 400I may be an icon or the like capable of specifying one data processing apparatus 400 instead of the photograph.

Figure 8A:
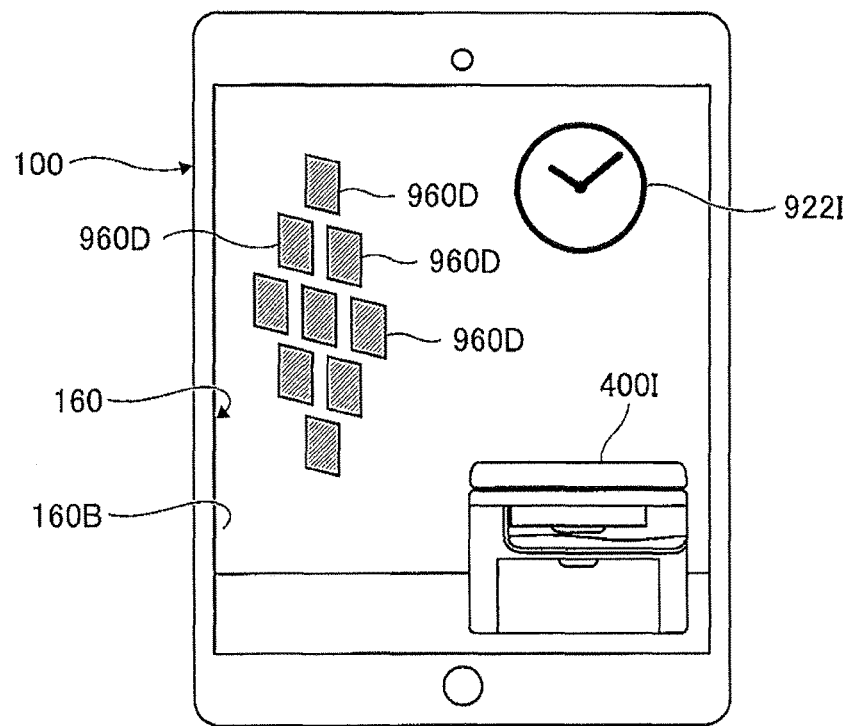
FIG. 8A is a diagram illustrating a first example of a request screen displayed on a display unit of a terminal device.

FIG. 8A illustrates a first example of a request screen 160B serving as a screen that is displayed on the display unit 160 and used for requesting the data processing apparatus 400 to process data. As illustrated in FIG. 8A, the processing apparatus image 400I and a data image 960D indicating data that is requested to be processed by the data processing apparatus 400 are displayed on the request screen 160B. In the request screen 160B illustrated in FIG. 8A, the data image 960D is displayed on an upper left portion of the display unit 160 that is a predetermined position of the display unit 160.

Here, examples of data indicated by the data image 960D include a text file, an image file, and a data file created by a specific application such as word processing software.

Figure 8B:
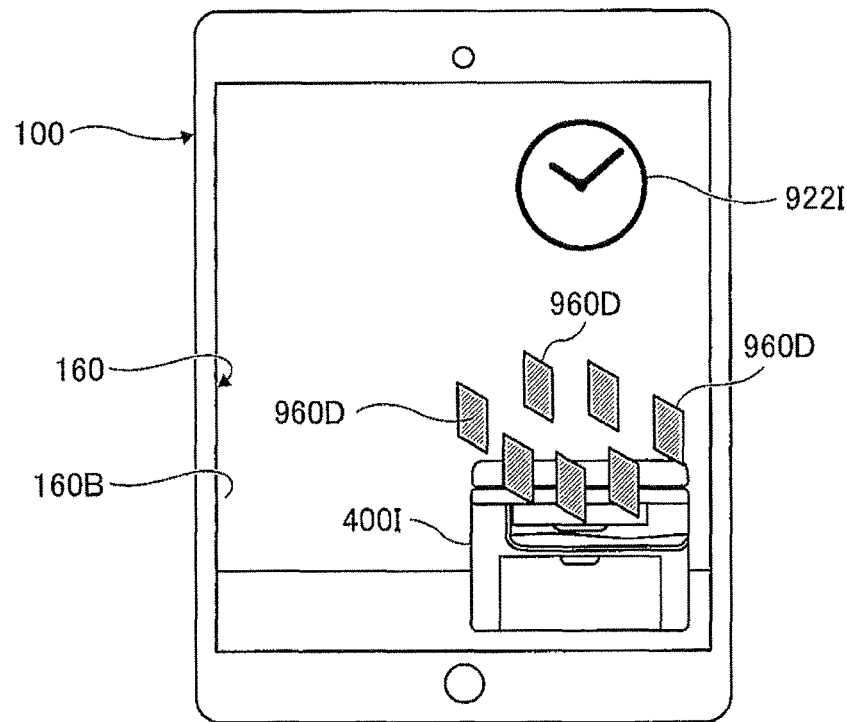
FIG. 8B is a diagram illustrating a second example of the request screen displayed on the display unit of the terminal device.

FIG. 8B illustrates a second example of the request screen 160B. In the first example of the request screen 160B illustrated in FIG. 8A, the data image 960D is displayed at a predetermined position of the display unit 160. On the other hand, in the second example, the data image 960D is displayed such that at least one data image 960D is arranged at a position overlapping the processing apparatus image 400I. In the second example, the plural data images 960D are arranged and displayed to have a depth in a direction crossing the surface of the display unit 160.

In the examples of FIGS. 8A and 8B, one processing apparatus image 400I and the plural data images 960D are displayed on the request screen 160B, but it is desirable that at least one processing apparatus image 400I and at least one data image 960D be displayed on the request screen 160B.

Figure 9A:
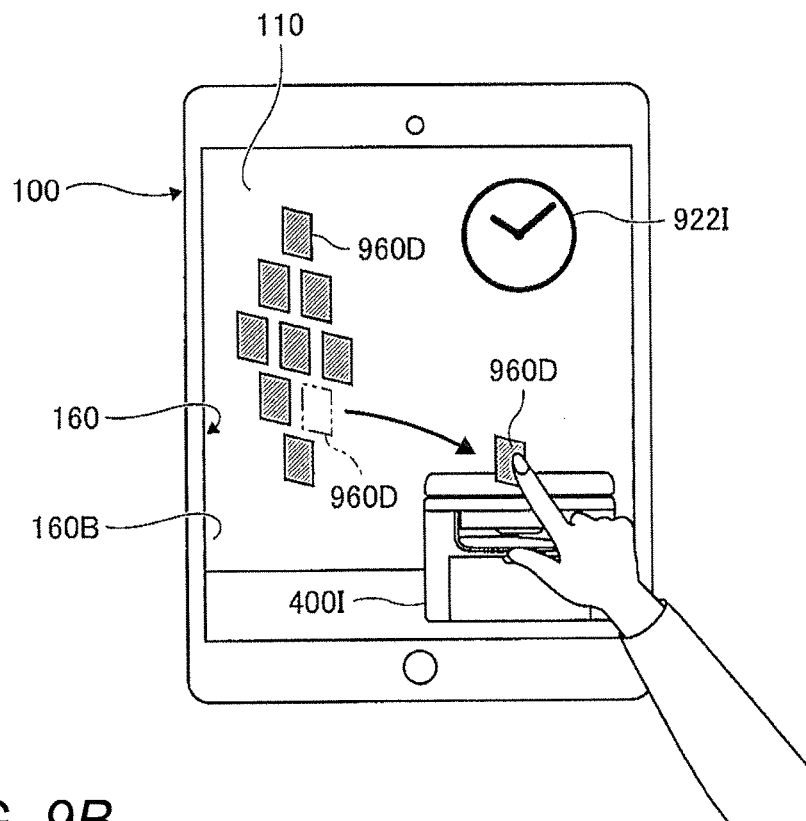
FIG. 9A is a diagram for describing a first example of an operation of requesting a data processing apparatus to process data on a request screen.

FIG. 9A illustrates a first example of an operation of requesting the data processing apparatus 400 to process data on the request screen 160B. As illustrated in FIG. 9A, in the first example, in order to request the data processing apparatus 400 to process data, the operator drags the data image 960D indicating data that is desired to be processed on the operating unit 110 serving as a touch panel using a finger, and drags the dragged data image 960D onto the processing apparatus image 400I indicating the data processing apparatus 400 that is desired to process the dragged data image 960D.

Figure 9B:
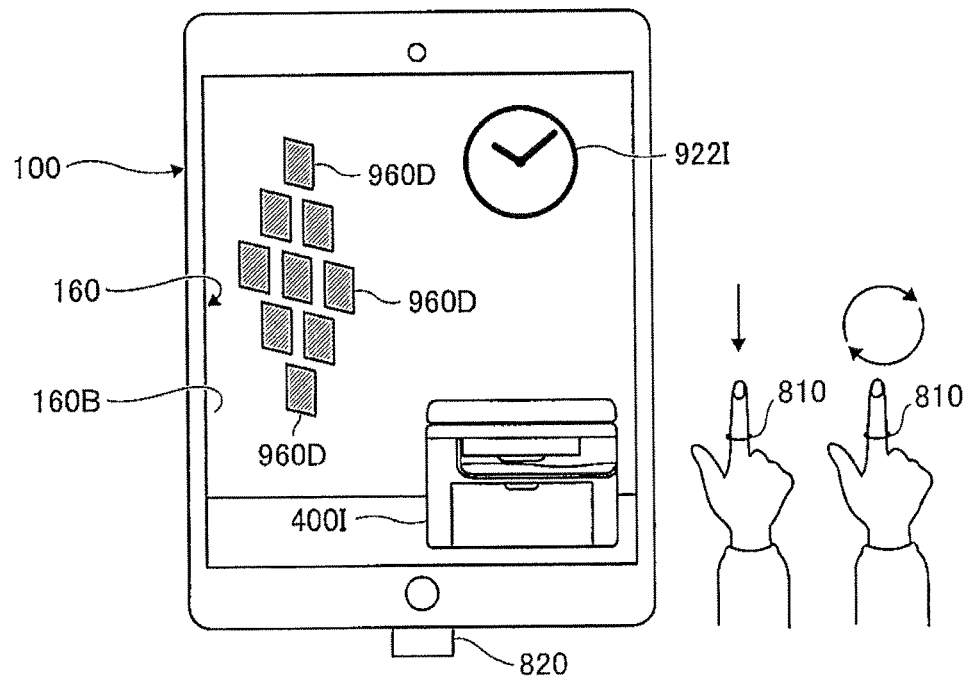
FIG. 9B is a diagram for describing a second example of the operation of requesting the data processing apparatus to process data on the request screen.

FIG. 9B illustrates a second example of the operation of requesting the data processing apparatus 400 to process data on the request screen 160B. In the second example, the operator requests the data processing apparatus 400 to process data by making a gesture. More specifically, the operator selects the data image 960D by making a gesture of pulling the data image 960D in space, and requests the data processing apparatus 400 to process data indicated by the selected data image 960D by making a gesture of turning a finger in space in the state in which the data image 960D is selected.

In order to perform the operation as in the second example described above with reference to FIG. 9B, for example, it is necessary for the operator to wear a ring type or a wristwatch type of wearable terminal 810. In addition to the configuration illustrated in FIG. 2, the terminal device 100 preferably includes a position detecting unit (not illustrated) that detects the position of the wearable terminal 810 and inputs a detection result to the control unit 102. Instead of installing the position detecting unit in the terminal device 100, the terminal device 100 may be equipped with a position detecting apparatus 820 that detects the position of the wearable terminal 810.

Figure 10A:
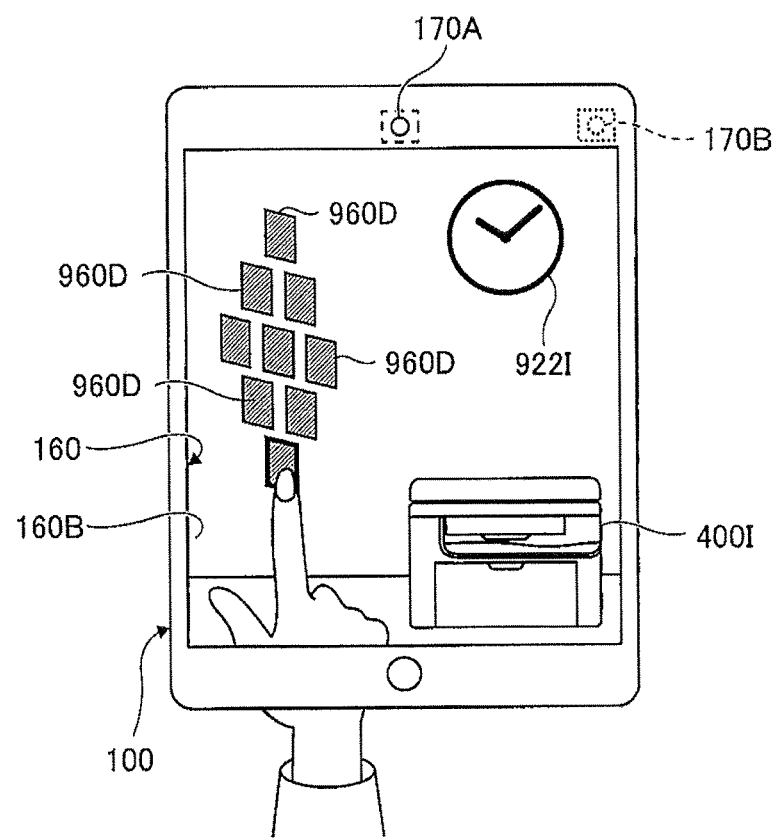
FIGS. 10A and 10B are diagrams for describing a third example of the operation of requesting the data processing apparatus to process data on the request screen.
Figure 10B:
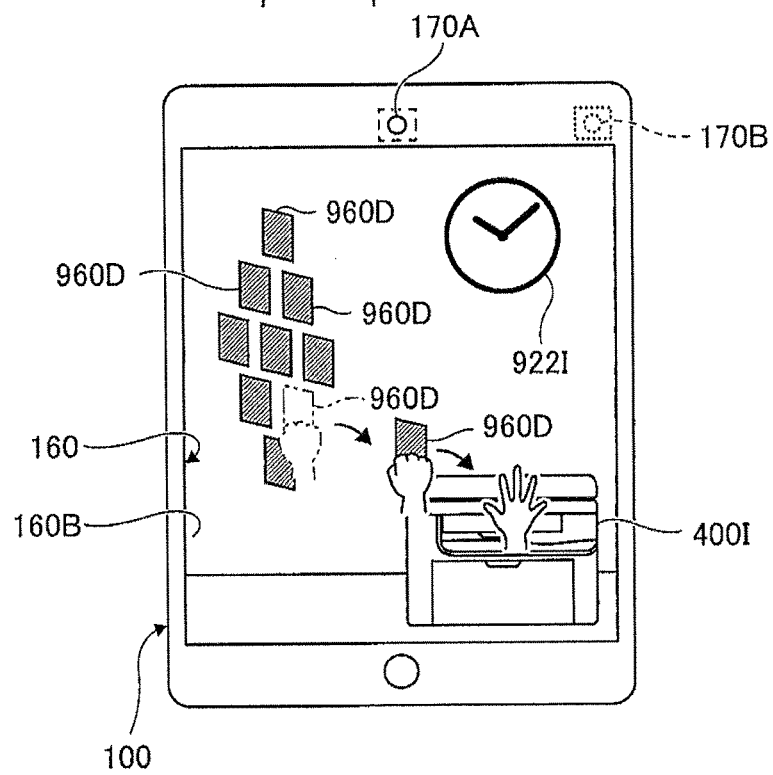

FIGS. 10A and 10B illustrate a third example of the operation of requesting the data processing apparatus 400 to process data on the request screen 160B. In the third example, similarly to the second example, the operator requests the data processing apparatus 400 to process data through a gesture of the operator. More specifically, the operator selects the data image 960D by making a gesture of pointing the data image 960D indicating data that is desired to be processed in space and further making a gesture of grabbing the data image 960D as illustrated in FIG. 10A.

Then, the data image 960D in the grabbed state is moved to overlap the processing apparatus image 400I by moving the hand in space in a state of grabbing the data image 960D, as illustrated in FIG. 10B. Then, the data processing apparatus 400 is requested to process the data indicated by the data image 960D by making a gesture of opening fingers in the state in which the data image 960D overlaps the processing apparatus image 400I.

In order to perform the operation as in the third example described above with reference to FIGS. 10A and 10B, the hand of the operator is photographed through the camera apparatus 170A or the camera apparatus 170B, photographed data is input to the control unit 102, the position of the hand of the operator is calculated through the control unit 102, and the control unit 102 causes an image of the hand to be displayed on the request screen 160B based on the calculated position of the hand.

In the above-described third example, the camera apparatus 170B is used to photograph the hand of the operator. Thus, the operator need not wear the wearable terminal 810, and the position detecting apparatus 820 need not be installed in the terminal device 100 as in the second example.

Figure 11:
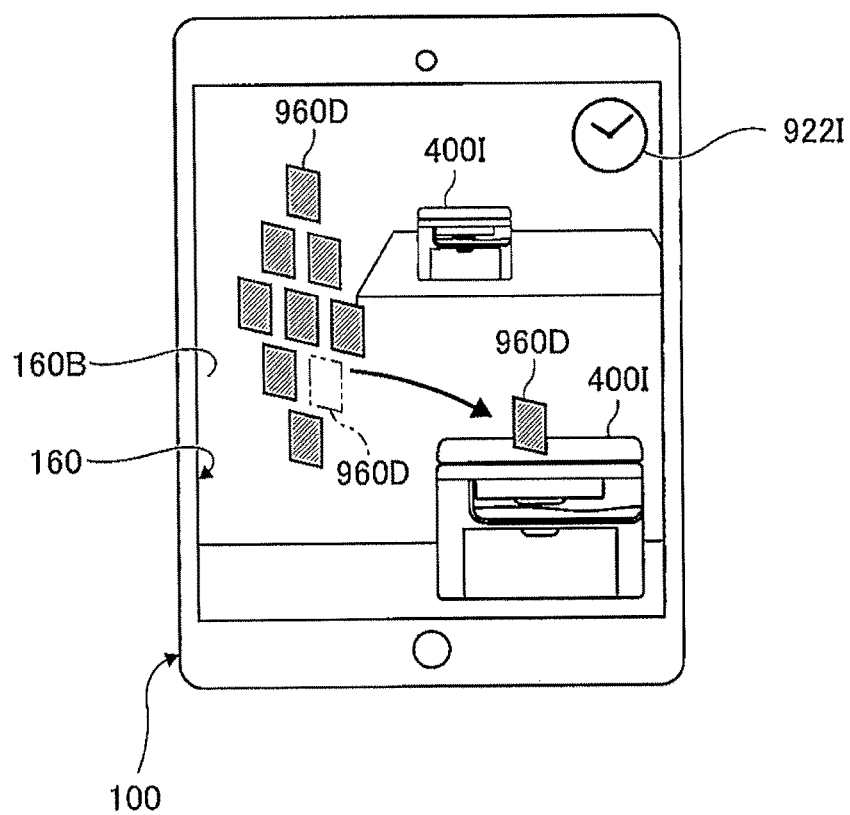
FIG. 11 is a diagram for describing an operation of requesting a data processing apparatus to process data when plural processing apparatus images are displayed on a request screen.

FIG. 11 illustrates a third example of the request screen 160B. In the first and second examples of the request screen 160B, one processing apparatus image 400I is displayed on the request screen 160B (see FIGS. 8A and 8B). On the other hand, in the third example, two processing apparatus images 400I are displayed on the request screen 160B. In the request screen 160B, the data processing apparatus 400 positioned to be closer to the terminal device 100 among the data processing apparatuses 400 indicated by the plural processing apparatus images 400I to be displayed is displayed with a larger size on the request screen 160B.

In the third example of the request screen 160B illustrated in FIG. 11, in order to request the data processing apparatus 400 to process data, it is desirable to move the data image 960D indicating the data that is desired to be processed to the processing apparatus image 400I indicating the data processing apparatus 400 that is desired to process on the request screen 160B. In order to move the data image 960D, the operator may drag and drops the data image 960D on the operating unit 110 configured with the touch panel, the operator may make a gesture in space in the state in which the wearable terminal 810 is worn, or the operator may make a gesture in space so that, for example, motion of the hand can be detected by the camera apparatus 170B.

Each of FIGS. 12A to 12D illustrates a data designation screen 160C serving as a screen that is displayed on the display unit 160 and used for designating data that is requested to be processed by the data processing apparatus 400. In the data designation screen 160C, at least one data image 960D is displayed, and when there are plural data images 960D to be displayed, the data images 960D are displayed to have a depth in a direction crossing the data designation screen 160C.

Figure 12C:
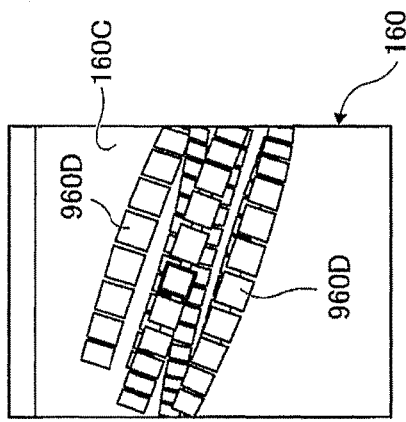
FIGS. 12A to 12D are diagrams illustrating examples of a data selection screen displayed on a display unit of a terminal device.
Figure 12B:
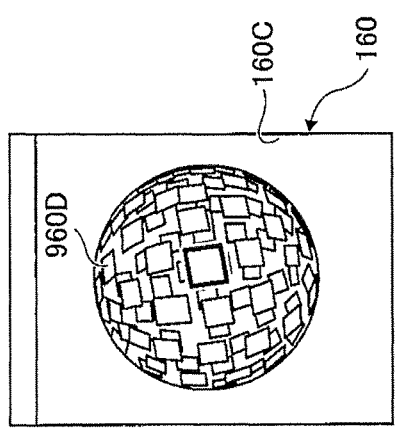
Figure 12A:
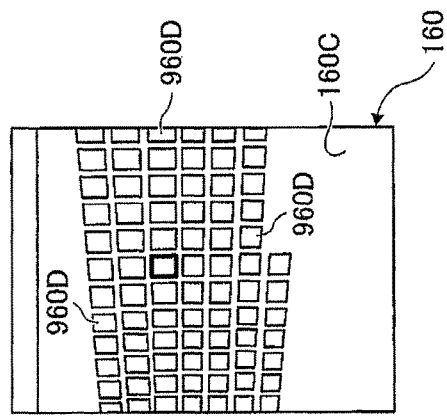

In other words, in the example illustrated in FIG. 12A, the plural data images 960D are displayed on the data designation screen 160C such that the plural data images 960D are arranged on one plane oblique to the data designation screen 160C. In the example illustrated in FIG. 12B, the plural data images 960D are displayed on the data designation screen 160C such that the plural data images 960D are arranged on a spherical surface. In the example illustrated in FIG. 12C, the plural data images 960D are displayed on the data designation screen 160C such that the plural data images 960D are arranged on one curved band. In the example illustrated in FIG. 12D, the plural data images 960D are displayed such that the plural data images 960D are arranged on plural planes that are arranged to be oblique to the data designation screen 160C and parallel to each other.

Figure 12F:
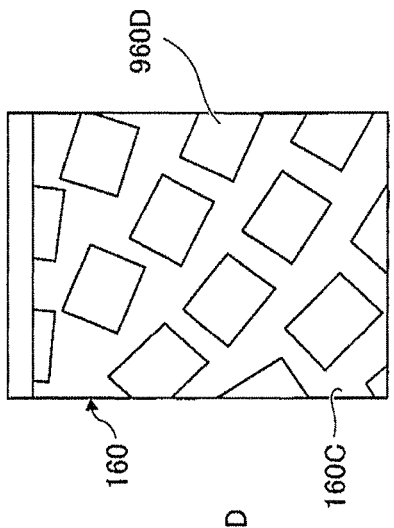
FIG. 12E and FIG. 12F are diagrams illustrating states in which the data selection screen illustrated in FIG. 12B is operated.
Figure 12E:
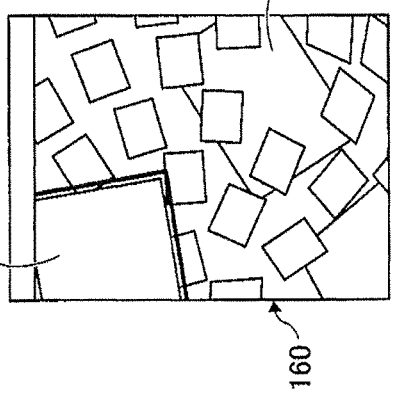
Figure 12D:
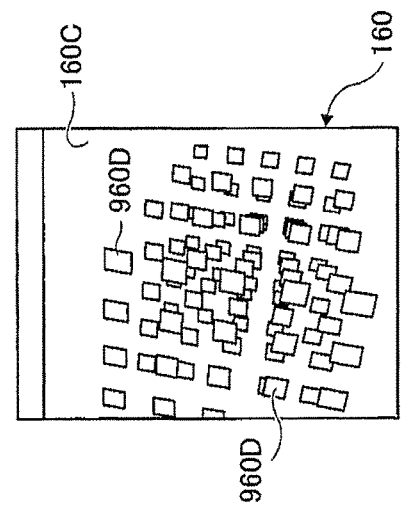

FIGS. 12E and 12F illustrate the data designation screens 160C after the operation is performed in the state illustrated in FIG. 12B. More specifically, FIG. 12E illustrates the plural data images 960D as if the plural data images 960D are viewed in such manner that a point of view is moved to a position close to the spherical surface formed by the plural data images 960D arranged as illustrated in FIG. 12B. FIG. 12F illustrates the plural data images 960D as if the plural data images 960D are viewed from a point of view that is moved to the inside of the spherical surface formed by the plural data images 960D.

As described above, by performing the operation of moving the point of view from which the plural data images 960D displayed to have the depth are viewed, it is possible to more easily find a desired data image 960D and more easily designate a desired data image 960D.

The data designation screens 160C illustrated in FIG. 12A to FIG. 12F may be operated, for example, by operating the touch panel by the operator, making a gesture by the operator in the state in which the wearable terminal 810 (see FIGS. 9A and 9B) is worn, or making a gesture by the operator while detecting the position of the finger of the operator through the camera apparatus 170B. More specifically, for example, a pointed data image 960D can be selected by making a gesture of pointing a specific data image 960D in space, and data indicated by the selected data image 960D can be designated as data to be processed by making the gesture of turning the fingertip in the state in which the data image 960D is selected.

FIG. 13A illustrates an example of a data display screen 160F serving as a screen that is displayed on the display unit 160 and used for displaying the data image 960D. In the example of FIG. 13A, for example, the data image 960D selected through the data designation screens 160C illustrated in FIGS. 12A to 12D is displayed on the data display screen 160F. In this example, for example, "please select apparatus through camera" is displayed on the data display screen 160F as a display 160k for encouraging an operation of selecting the data processing apparatus 400 that is requested to process data.

FIG. 13B is a diagram illustrating a fourth example of the request screen 160B displayed on the display unit of the terminal device 100 as an example of a screen displayed after due to the encouragement by the display 160k, for example, the data processing apparatus 400 is photographed through the camera apparatus 170, and the data processing apparatus 400 is selected. In the first and second examples of the request screen 160B, the plural data images 960D are displayed on the request screen 160B (see FIGS. 8A and 8B), and one data image 960D indicating data that is requested to be processed among the plural data images 960D is designated on the request screen 160B. On the other hand, in the fourth example, one data image 960D selected on the data designation screen 160C is displayed on the request screen 160B.

In the fourth example, in order to request the data processing apparatus 400 to process data, as illustrated in FIG. 13C, for example, the operator performs an operation of dragging the data image 960D indicating the data that is desired to be processed on the operating unit 110 serving as the touch panel using the finger and then dragging the dragged data image 960D onto the processing apparatus image 400I indicating the data processing apparatus 400 that is desired to process.

Figure 14:
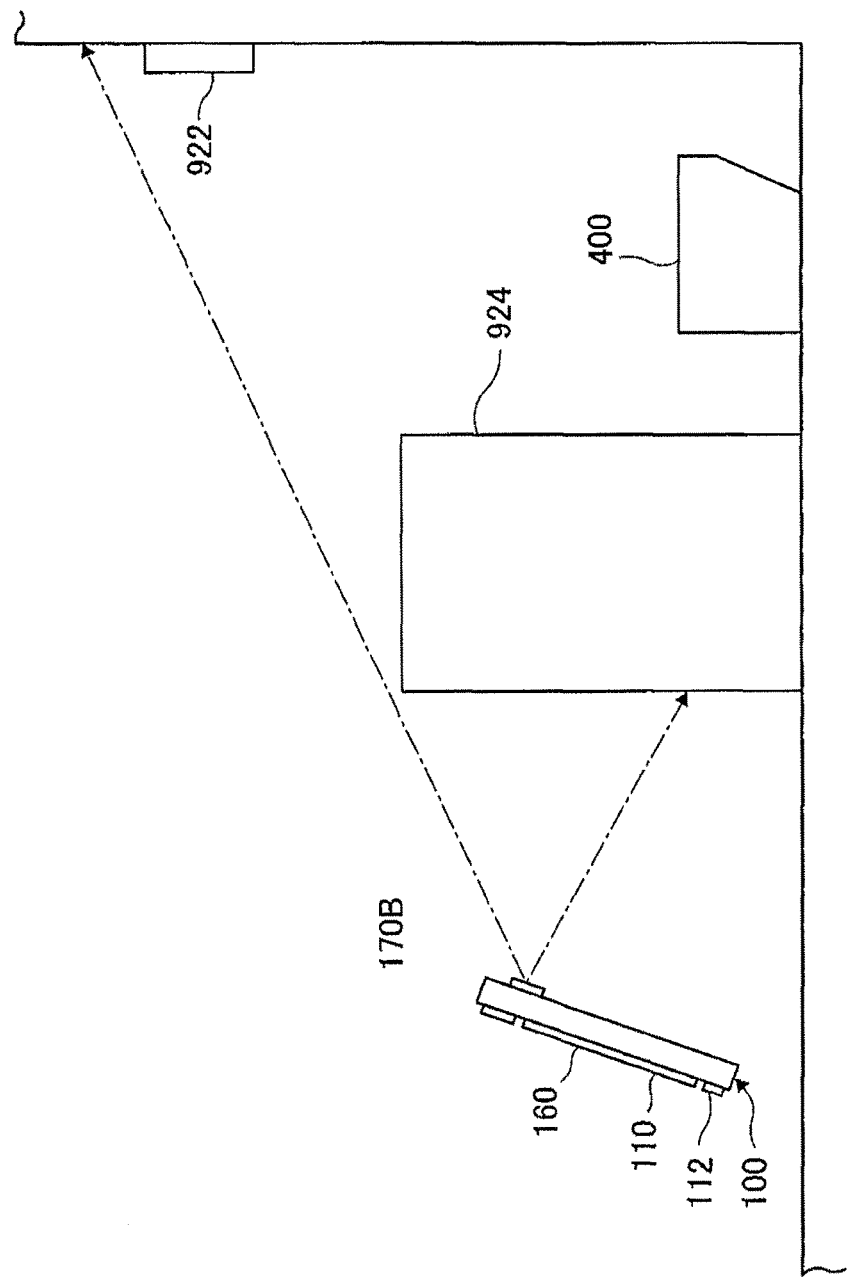
FIG. 14 is a diagram for schematically describing an operation of acquiring a processing apparatus image of a data processing apparatus through a terminal device.

FIG. 14 is a diagram schematically illustrating a second example of the operation of acquiring the processing apparatus image 400I serving as the image of the data processing apparatus 400 through the terminal device 100. In the first example of the operation of acquiring the processing apparatus image 400I, in order to acquire the processing apparatus image 400I, the data processing apparatus 400 is photographed, for example, using the camera apparatus 170B (FIG. 7A). On the other hand, in the second example, in order to acquire the processing apparatus image 400I, for example, the camera apparatus 170B is pointed at a specific direction, and the camera apparatus 170B is operated, for example, using the operating unit 110. As a result, when the camera apparatus 170B is operated, the image of the data processing apparatus 400 that is arranged in a direction in which the data processing apparatus 400 can be photographed through the camera apparatus 170B is acquired.

In the example illustrated in FIG. 14, the data processing apparatus 400 is positioned at the opposite side to the camera apparatus 170B with respect to an obstacle 924 such as a cabinet and thus unable to photograph the data processing apparatus 400 through the camera apparatus 170B. For this reason, it is not possible to acquire the processing apparatus image 400I by photographing the data processing apparatus 400 through the camera apparatus 170B using the first example. However, in the second example, even when the data processing apparatus 400 is arranged at the position at which it is not possible to photograph the data processing apparatus 400 through the camera apparatus 170B, it is possible to acquire the processing apparatus image 400I indicating the data processing apparatus 400 positioned in the direction in which the data processing apparatus 400 can be photographed through the camera apparatus 170B.

FIG. 15A illustrates a second example of the processing apparatus display screen 160A that is displayed on the display unit 160 and serves as a screen on which the processing apparatus image 400I acquired by the operation described with reference to FIG. 14 is displayed. In the first example of the processing apparatus display screen 160A, the photograph of the data processing apparatus 400 photographed through the camera apparatus 170B is used as the processing apparatus image 400I (see FIG. 7A). On the other hand, in the second example, the photograph of the data processing apparatus 400 that is photographed in advance and stored, for example, in the storage unit 530 (see FIG. 5) or an icon indicating the data processing apparatus 400 is used as the processing apparatus image 400I.

In the second example, in order to facilitate understanding of a positional relation between a position and a direction of the camera apparatus 170B and the data processing apparatus 400 indicated by the processing apparatus image 400I, the processing apparatus image 400I is displayed to overlap the photograph captured by the camera apparatus 170B when the camera apparatus 170B is operated. For example, in the example illustrated in FIG. 15A, the processing apparatus image 400I is displayed to overlap an obstacle image 924I serving as an image of the obstacle 924 to indicate that the data processing apparatus 400 is positioned at a hidden position behind the obstacle 924.

FIG. 15B illustrates a screen displayed after the second example of the processing apparatus display screen 160A illustrated in FIG. 15A is displayed as a third example of the processing apparatus display screen 160A displayed on the display unit 160. In the second example of the processing apparatus display screen 160A, the processing apparatus image 400I is displayed on the processing apparatus display screen 160A so that the positional relation between the obstacle 924 or the like and the data processing apparatus 400 can be easily understood. On the other hand, in the third example of the processing apparatus display screen 160A, the processing apparatus image 400I is displayed at a predetermined position of the processing apparatus display screen 160A, for example, on a lower right portion of the processing apparatus display screen 160A.

Transition from the processing apparatus display screen 160A illustrated in FIG. 15A to the processing apparatus display screen 160A illustrated in FIG. 15B may be performed, for example, after a predetermined period of time elapses or may be performed, for example, by an operation of the operator of tapping the processing apparatus image 400I on the processing apparatus display screen 160A.

FIG. 15C illustrates a fifth example of the request screen 160B displayed on the display unit 160. In the fifth example of the request screen, for example, the plural data images 960D are displayed in addition to the display of the third example of the processing apparatus display screen 160A illustrated in FIG. 15B. In order to request the data processing apparatus 400 to process data on this screen, the operator preferably performs, for example, the operation of dragging the data image 960D indicating the data that is desired to be processed and then dragging the data image 960D onto the processing apparatus image 400I indicating the data processing apparatus 400 that is desired to process.

Figure 16A:
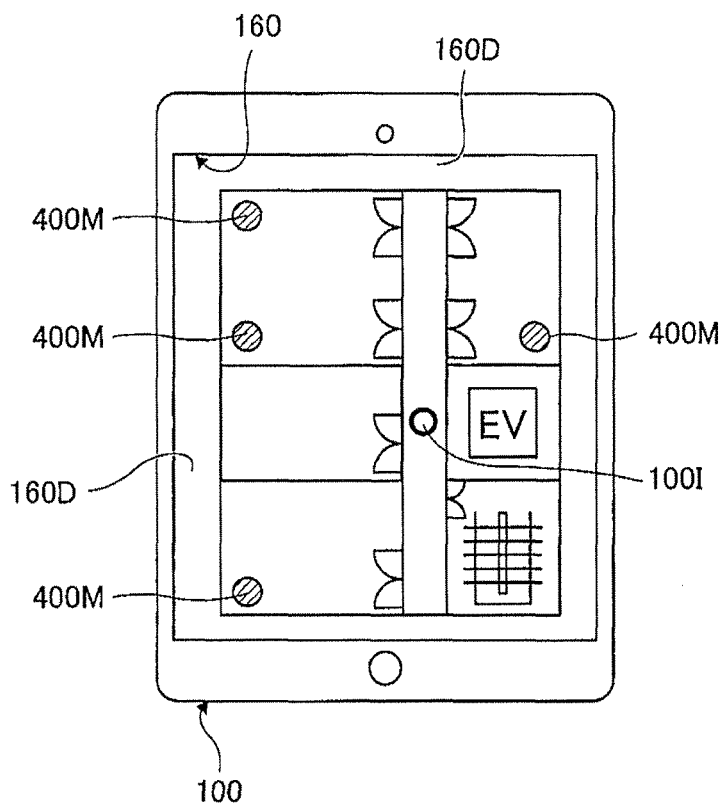
FIG. 16A is a diagram illustrating an example of a processing apparatus selection screen displayed on a display unit of a terminal device.

FIG. 16A illustrates a processing apparatus designation screen 160D serving as a screen that is displayed on the display unit 160 and used for designating the data processing apparatus 400 that is requested to process. In the processing apparatus designation screen 160D, a sketch map of an area around the position of the terminal device 100 is displayed, the position of the terminal device 100 on the sketch map is further indicated, for example, by a mark 1001 such as an icon, and the data processing apparatuses 400 installed within the range displayed on the sketch map and the positions of the data processing apparatuses 400 on the sketch map are indicated, for example, by marks 400M such as icons.

In order to designate the data processing apparatus 400 that is requested to process data on the processing apparatus designation screen 160D, the operator preferably performs, for example, an operation of tapping the mark, on the sketch map, indicating the data processing apparatus 400 that is desired to process, for example, the data processing apparatus 400 at the position closest to the terminal device 100.

Figure 16B:
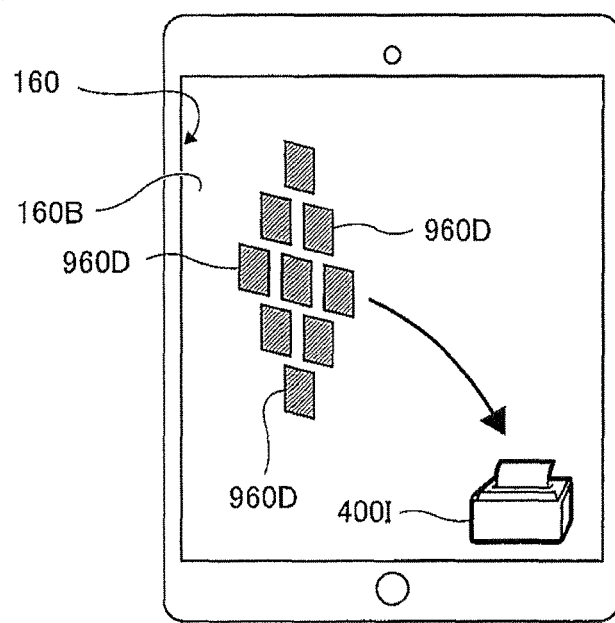
FIG. 16B is a diagram illustrating a request screen displayed on the display unit after the processing apparatus selection screen illustrated in FIG. 16A is operated.

FIG. 16B illustrates a sixth example of the request screen 160B displayed on the display unit 160. In the sixth example of the request screen, for example, the processing apparatus image 400I indicating the data processing apparatus 400 designated on the processing apparatus designation screen 160D illustrated in FIG. 16A is displayed, for example, on a lower right portion, and, for example, the plural data images 960D are further displayed. In the sixth example of the request screen 160B, in order to request the data processing apparatus 400 to process data, the operator preferably performs, for example, the operation of dragging the data image 960D indicating the data that is desired to be processed and then dragging the data image 960D onto the processing apparatus image 400I indicating the data processing apparatus 400 that is desired to process.

Figure 17:
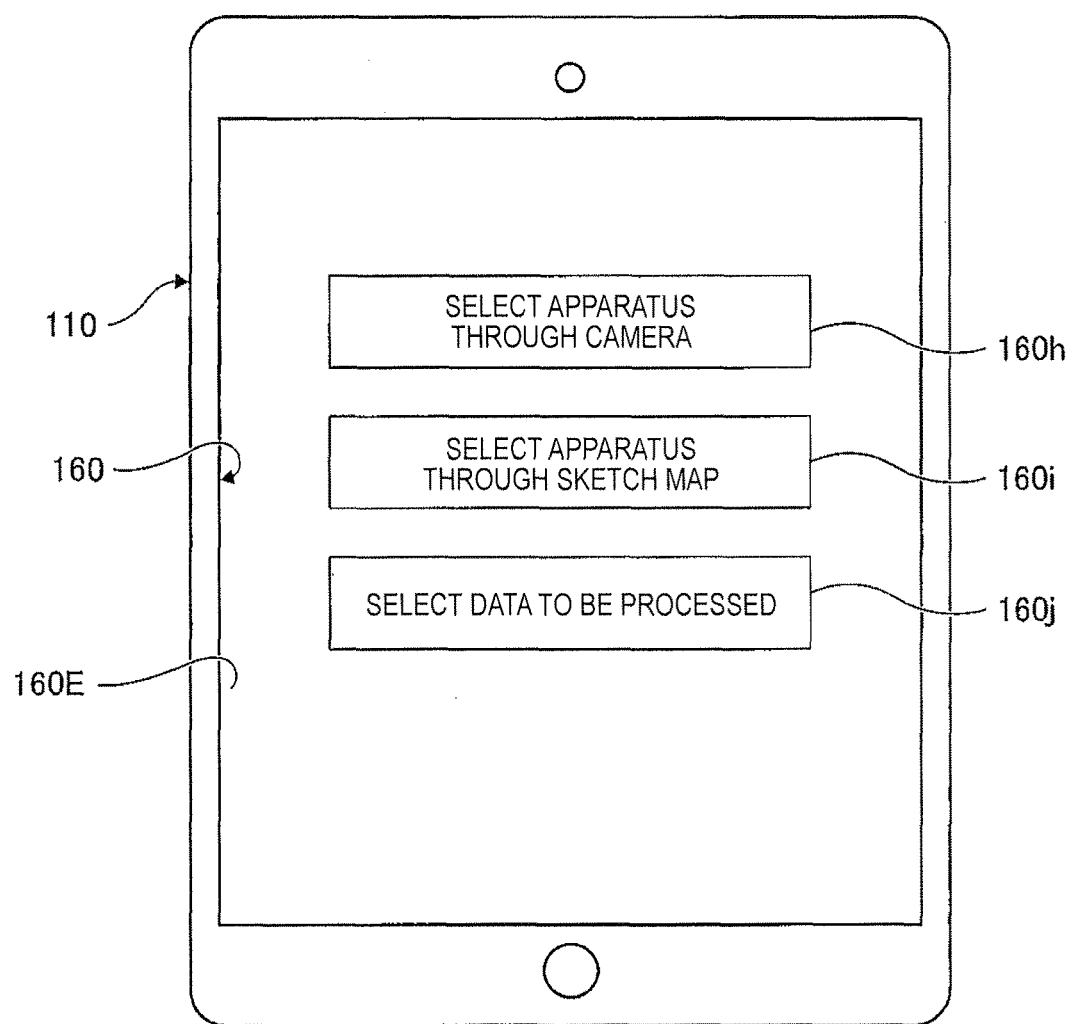
FIG. 17 is a diagram illustrating an example of a mode selection screen displayed on a display unit of a terminal device.

FIG. 17 illustrates a mode selection screen 160E serving as a screen that is displayed on the display unit 160 and first displayed after an application is activated. The mode selection screen 160E is used for selecting a mode indicating an order and a method in which data that is desired to be processed and the data processing apparatus 400 that is desired to process are designated.

A mode selection button 160h for selecting the camera selection mode in which the data processing apparatus 400 that is requested to process is selected before data that is requested to be processed is selected, and the camera apparatus 170 is used to select the data processing apparatus 400 is displayed on the mode selection screen 160E. Further, a mode selection button 160i for selecting a sketch map mode in which the data processing apparatus 400 that is requested to process is selected before data that is requested to be processed is selected, and a sketch map (see FIG. 16A) is used for selection of the processing apparatus is displayed on the mode selection screen 160E. Further, a mode selection button 160j for selecting a data selection mode in which data that is requested to be processed is selected before the data processing apparatus 400 that is requested to process is selected is displayed on the mode selection screen 160E.

Figure 18:
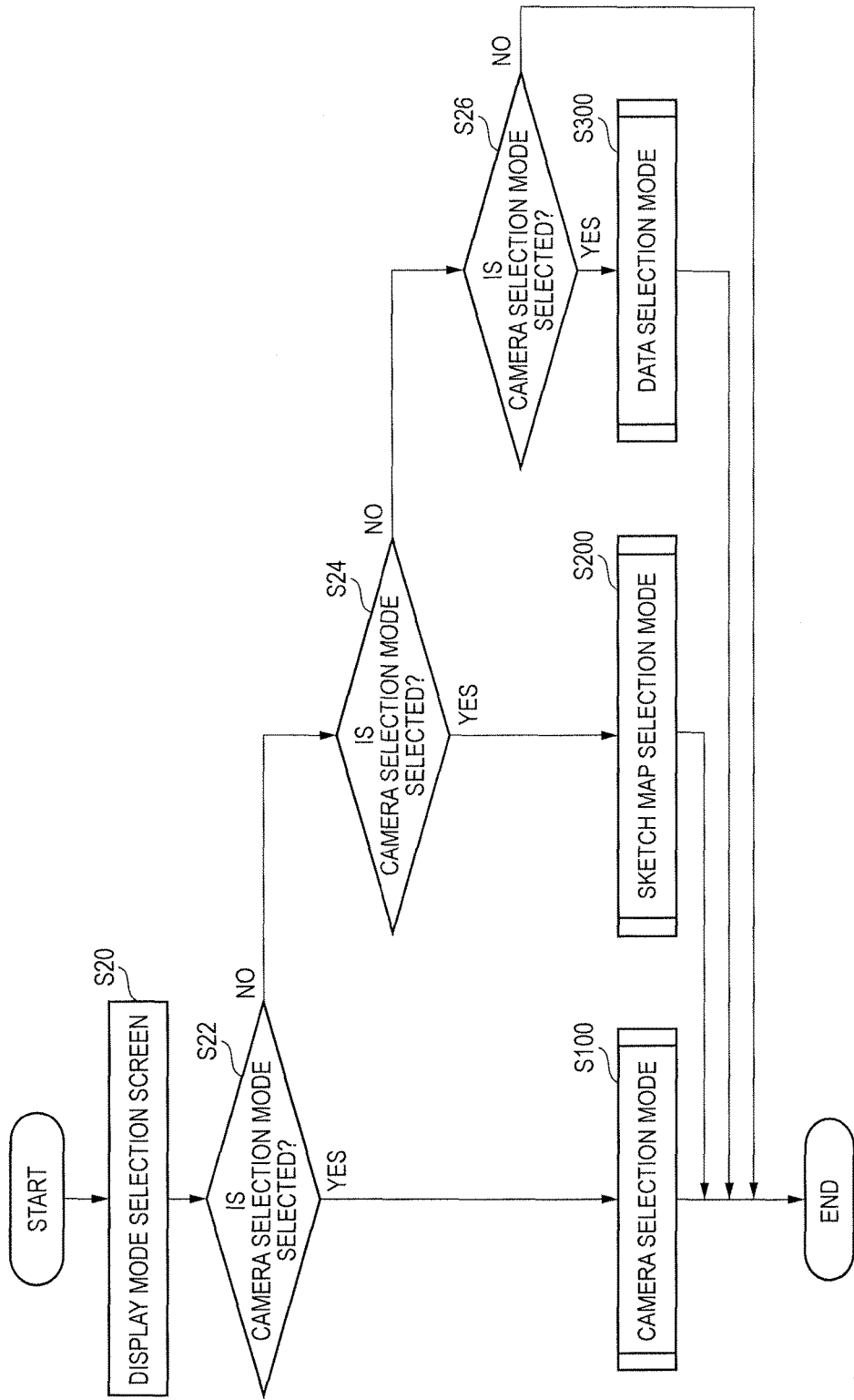
FIG. 18 is a flowchart for describing an operation when a mode of the terminal device illustrated in FIG. 1 is selected.

FIG. 18 illustrates an operation of the data processing system 10. For example, when the operator operates the auxiliary operating unit 112 to activate the application, and thus a series of operations start, in step S20, the control unit 102 controls the display unit 160 such that the mode selection screen 160E is displayed on the display unit 160.

When the operator operates the mode selection button 160h to select the camera selection mode in step S22, the process proceeds to the camera selection mode in step S100. When the operator operates the mode selection button 160i to select the sketch map selection mode in step S24, the process proceeds to the sketch map selection mode in step S200. When the operator operates the mode selection button 160j to select the data selection mode in step S26, the process proceeds to the data selection mode in step S300.

On the other hand, for example, when none of the camera selection mode, the sketch map mode, and the data selection mode is selected within a predetermined period of time, the control unit 102 ends the application.

Figure 19:
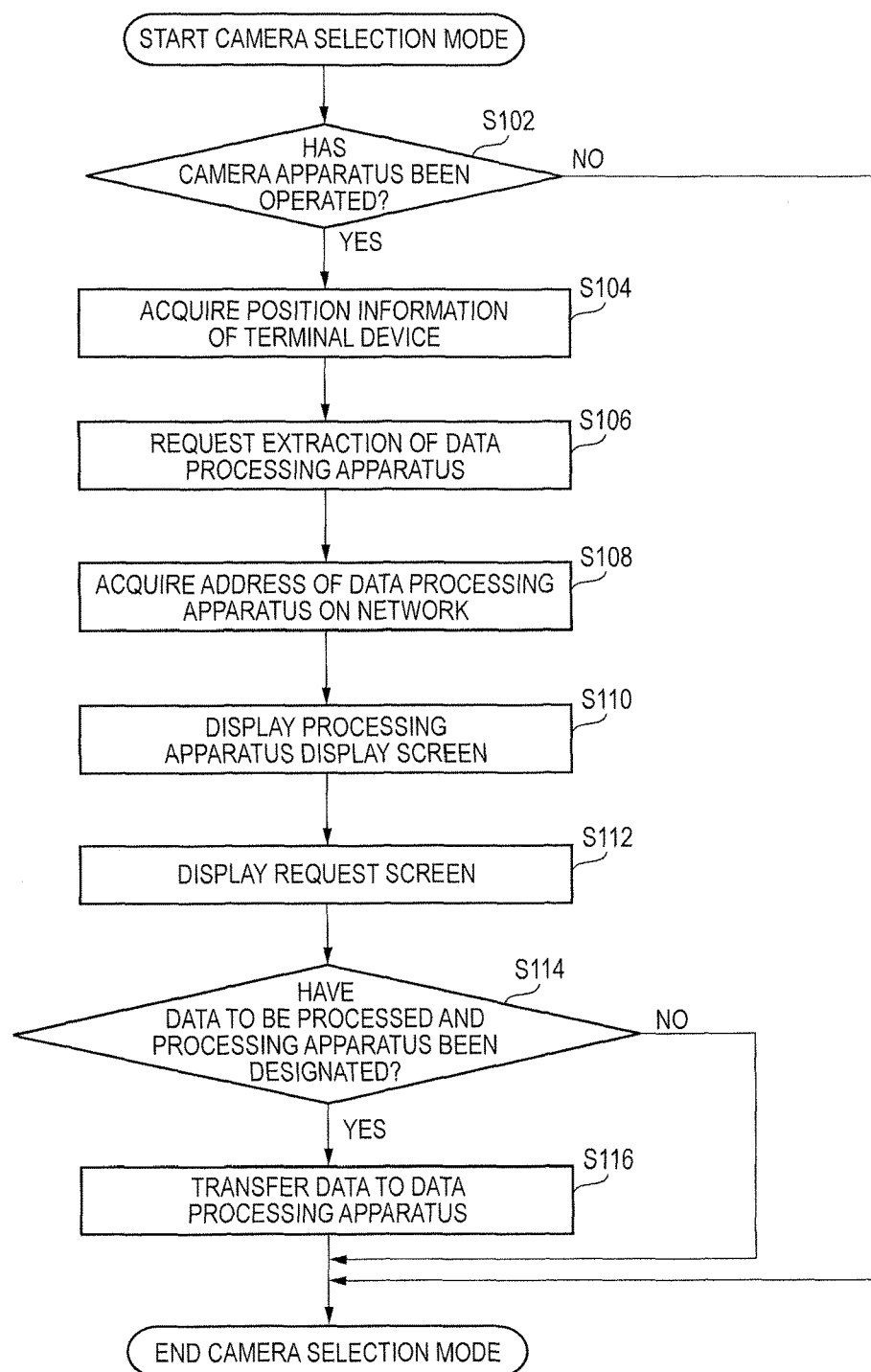
FIG. 19 is a flowchart for describing an operation in a camera selection mode of the terminal device illustrated in FIG. 1.

FIG. 19 illustrates the operation of the data processing system 10 in the camera selection mode. When the control unit 102 confirms that the camera apparatus 170 has been operated in step S102, the process proceeds to the next step S104. On the other hand, for example, when the control unit does not confirm the operation of the camera apparatus 170 within a predetermined period of time, the control unit 102 ends the application.

In step S104 of the next step, the control unit 102 acquires the position information of the terminal device 100 when the camera apparatus 170 is operated. More specifically, the control unit 102 causes the GPS receiving unit 120 to detect the radio waves from the GPS satellites and acquire the position information of the terminal device 100. At this time, preferably, the control unit 102 causes the acceleration sensor 140 to detect the posture of the terminal device 100 when the camera apparatus 170 is operated and causes the electronic compass 150 to detect the direction of the terminal device 100 when the camera apparatus 170 is operated.

In step S106 of the next step, the control unit 102 requests the management apparatus 500 to extract the data processing apparatus 400. More specifically, the control unit 102 controls the wireless communication unit 130 such that the wireless communication unit 130 performs communication with the wireless communication apparatus 300, transmits the position information of the terminal device 100 and preferably the detection results of the posture and the direction of the terminal device 100 to the management apparatus 500 via the network 600, and requests the management apparatus 500 to extract the corresponding data processing apparatus 400 from the database stored in the storage unit 530 based on the values.

In the next step S108, the control unit 102 acquires the address of the data processing apparatus 400 extracted in step S106 on the network 600. More specifically, the control unit 102 requests the management apparatus 500 to extract the address of the data processing apparatus 400 extracted in step S106 on the network from the database stored in the storage unit 530, and further requests the management apparatus 500 to transmit the extracted address on the network to the terminal device 100.

In the next step S110, the control unit 102 causes the display unit 160 to display the processing apparatus display screen 160A. At this time, when the data processing apparatus 400 extracted in step S106 is shown in the photograph captured through the camera apparatus 170 in step S102, the photograph captured through the camera apparatus 170 is used as the processing apparatus image 400I, and the image of the data processing apparatus 400 in the photograph is used as the processing apparatus image 400I (see the first example of the processing apparatus display screen 160A illustrated in FIG. 7B).

On the other hand, for example, when the data processing apparatus 400 extracted in step S106 is arranged at the position hidden by an obstacle, and thus the data processing apparatus 400 is not shown in the photograph captured in step S102, the control unit 102 uses the image of the data processing apparatus 400 that is photographed in advance and stored in the storage unit 530 of the management apparatus 500, the icon indicating the data processing apparatus 400, or the like as the processing apparatus image 400I (see the second example of the processing apparatus display screen 160A illustrated in FIG. 15A).

In step S112 of the next step, the control unit 102 causes the display unit 160 to display the request screen 160B. In other words, an image displayed so that at least one data image 960D is superposed on the processing apparatus display screen 160A displayed in step S110 is displayed on the display unit 160 (for example, see the first example of the request screen 160B illustrated in FIG. 8A and the fourth example of the request screen 160B illustrated in FIG. 15C).

When the operator designates the data image 960D indicating data to be processed, and designates the processing apparatus image 400I indicating the data processing apparatus that is requested to be processed in step S114 of the next step, in step S116, the control unit 102 transfers the data indicated by the selected data image 960D to the data processing apparatus 400 through the wireless communication apparatus 300 and the network 600.

For example, when the data image 960D and the processing apparatus image 400I are not selected within a predetermined period of time in step S114, the control unit 102 ends the application.

Figure 20:
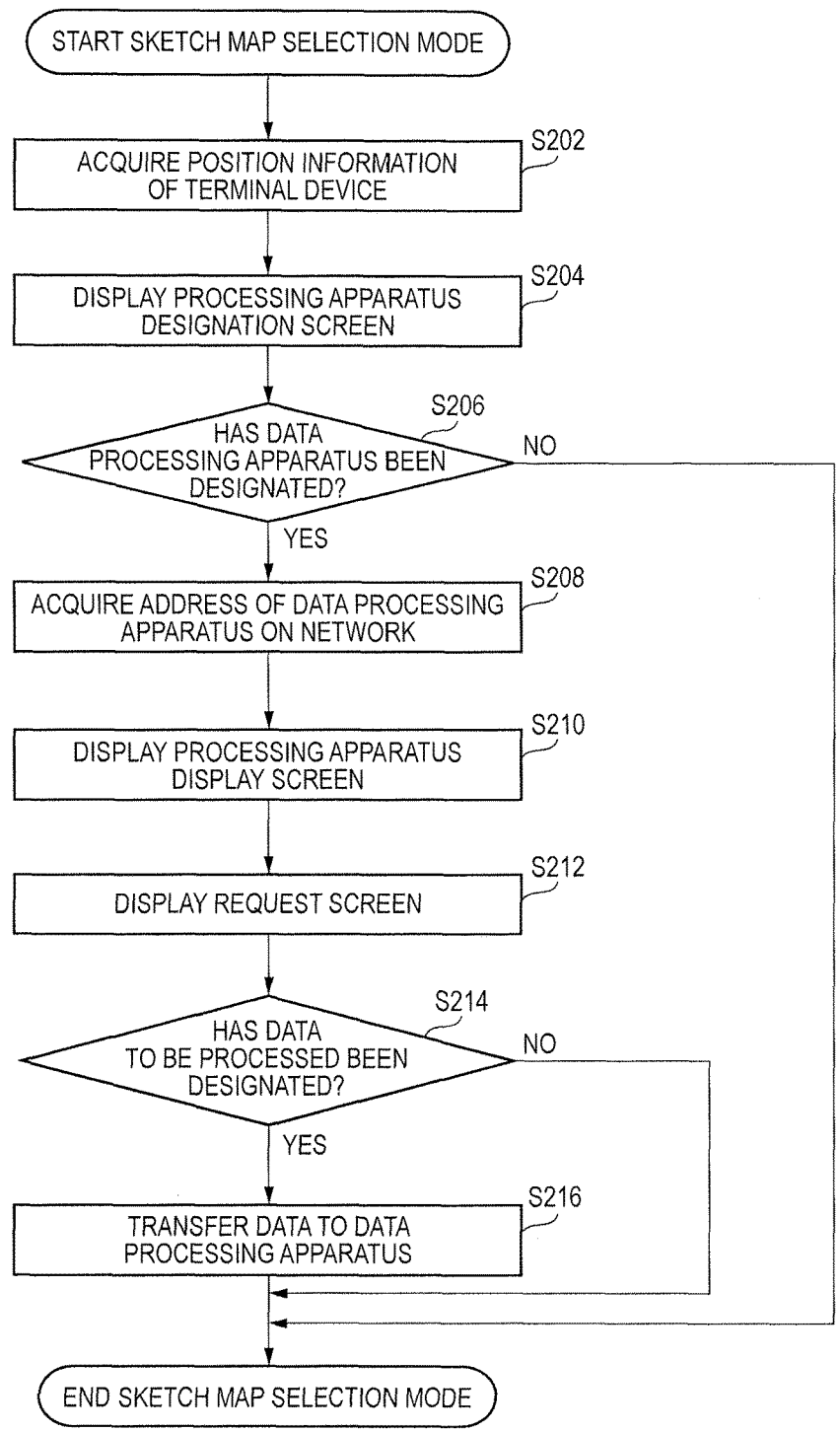
FIG. 20 is a flowchart for describing an operation in a sketch map selection mode of the terminal device illustrated in FIG. 1.

FIG. 20 describes the operation of the data processing system 10 in the sketch map selection mode. When the sketch map selection mode is selected, in step S202, the control unit 102 acquires the position information of the terminal device 100 at a point in time at which the sketch map selection mode is selected. More specifically, the control unit 102 causes the GPS receiving unit 120 to detect the radio waves from the GPS satellites and acquire the position information of the terminal device 100.

In step S204 of the next step, the control unit 102 causes the display unit 160 to display the processing apparatus designation screen 160D indicating the sketch map of the area around the position of the terminal device 100, the position of the terminal device 100 in the sketch map, and the position of the data processing apparatus 400 in the sketch map based on the position information of the terminal device 100 acquired in step S202 (see the processing apparatus designation screen 160D illustrated in FIG. 16A). More specifically, the control unit 102 transmits the position information of the terminal device 100 acquired in step S204 to the management apparatus 500, requests the management apparatus 500 to generate the processing apparatus designation screen 160D and transfer the generated processing apparatus designation screen 160D to the terminal device 100, and causes the display unit 160 to display the processing apparatus designation screen 160D transmitted from the management apparatus 500.

At this time, the control unit 502 of the management apparatus 500 generates the processing apparatus designation screen 160D based on the position data of the terminal device 100 transmitted from the terminal device 100, the position data of the data processing apparatus 400 stored in the storage unit 530, and the sketch map stored in the storage unit 530.

When the operator designates the mark 400M indicating the data processing apparatus 400 that is requested to process in step S206 of the next step, in step S208 of the next step, the control unit 102 acquires the address of the data processing apparatus 400 whose mark 400M is selected in step S206 on the network 600. More specifically, the control unit 102 requests the management apparatus 500 to transmit the address of the data processing apparatus 400 whose mark 400M is selected on the network 600.

In step S212 of the next step, the control unit 102 causes the display unit 160 to display the request screen 160B (see the fifth example of the request screen 160B illustrated in FIG. 16B). More specifically, in step S210, the control unit 102 causes the management apparatus 500 transfer the processing apparatus image 400I of the data processing apparatus 400 whose mark 400M is selected, causes the display unit 160 to display the transferred processing apparatus image 400I, and further causes the display unit 160 to display the data image 960D.

When the operator designates the data image 960D indicating data to be processed in step S214 of the next step, in step S216, the control unit 102 controls the wireless communication unit 130 such that the data indicated by the selected data image 960D is transferred to the data processing apparatus 400 indicated by the mark 400M selected in step S206 through the wireless communication apparatus 300 and the network 600.

For example, when the processing apparatus image 400I is not selected within a predetermined period of time in step S214, the control unit 102 ends the application.

Figure 21:
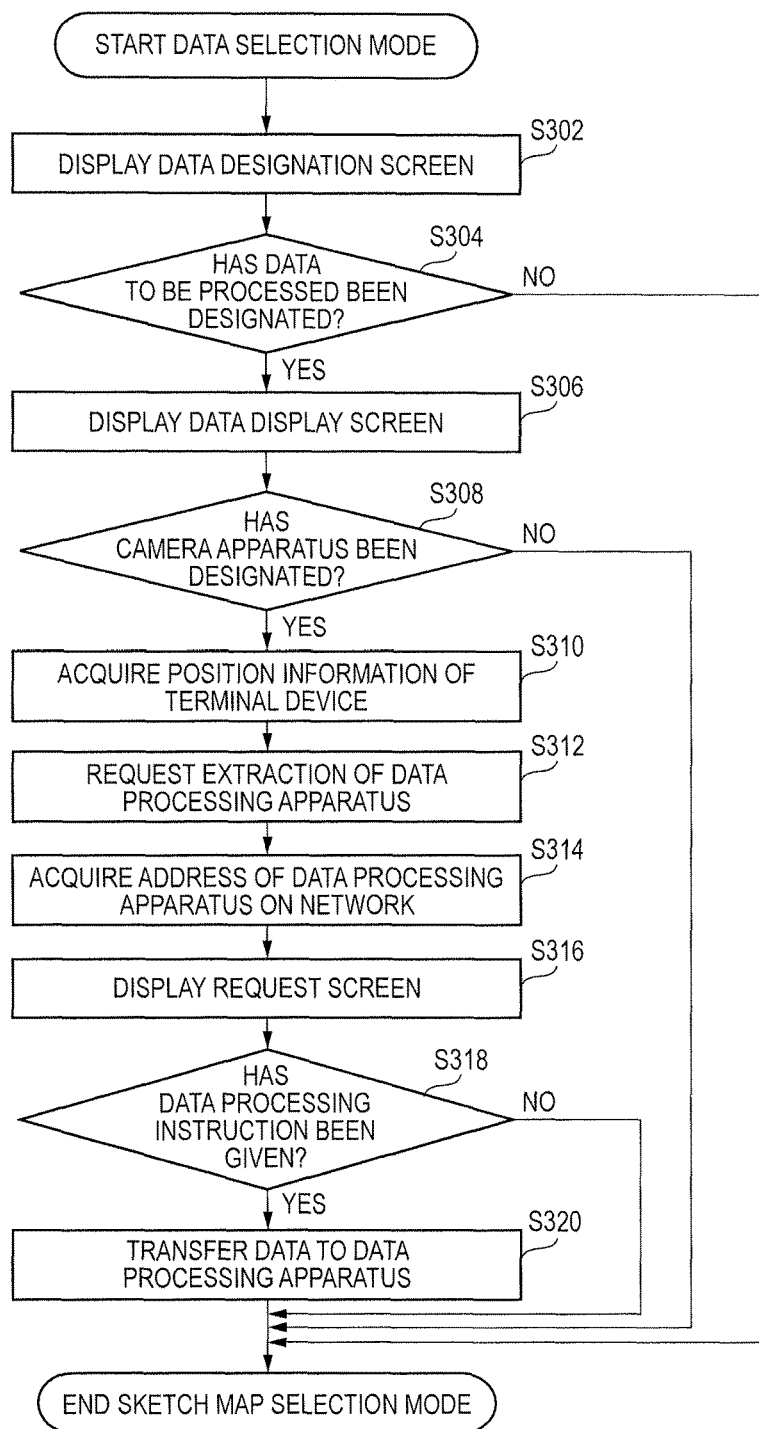
FIG. 21 is a flowchart for describing an operation in a data selection mode of the terminal device illustrated in FIG. 1.

FIG. 21 illustrates the operation of the data processing system 10 in the data selection mode. When the data selection mode is selected, in step S302, the control unit 102 causes the display unit to display the data designation screen 160C (see FIGS. 12A to 12D).

When the operator designates the data image 960D in the next step S304, in step S306 of the next step, the control unit 102 causes the display unit 160 to display the data display screen 160F, and the data display screen 160F is a screen on which the data image 960D selected in step S304 is displayed, for example, on the upper left portion of the display unit 160.

When the camera apparatus 170 is operated in step S308 of the next step, in step S310, the control unit 102 acquires the position information of the terminal device 100 based on the radio waves that are received from the GPS satellites 990 through the GPS receiving unit 120. On the other hand, when the camera apparatus 170 is not operated during a predetermined period of time in step S308, the control unit 102 ends the application.

In step S312 of the next step, the control unit 102 requests the management apparatus 500 to extract the data processing apparatus 400. More specifically, the control unit 102 controls the wireless communication unit 130 such that the wireless communication unit 130 performs communication with the wireless communication apparatus 300, transmits the position information of the terminal device 100 and preferably the detection results of the posture and the direction of the terminal device 100 to the management apparatus 500 via the network 600, and requests the management apparatus 500 to extract the corresponding data processing apparatus 400 from the database stored in the storage unit 530 based on the values.

In step S314 of the next step, the control unit 102 acquires the address of the data processing apparatus 400 extracted in step S312 on the network 600. More specifically, the control unit 102 requests the management apparatus 500 to extract the address of the data processing apparatus 400 extracted in step S106 on the network 600 from the database stored in the storage unit 530, and requests the management apparatus 500 to transmit the extracted address on the network to the terminal device 100.

In step S316 of the next step, the control unit 102 causes the display unit 160 to display the request screen 160B. In other words, the image displayed so that the processing apparatus image 400I indicating the data processing apparatus 400 in which the address on the network is acquired in step S314 is superposed on the data display screen 160F displayed in step S306 is displayed on the display unit 160 (see the third example of the request screen 160B illustrated in FIG. 13B).

When a data processing instruction is given in step S318 of the next step, in step S320, the control unit 102 controls the wireless communication unit 130 such that the wireless communication unit 130 transfers the data indicated by the selected data image 960D to the data processing apparatus 400 through the wireless communication apparatus 300 and the network 600.

For example, when the processing apparatus image 400I is not selected within a predetermined period of time in step S318, that is, when the data processing instruction is given, the control unit 102 ends the application.

Second Exemplary Embodiment

Figure 22:
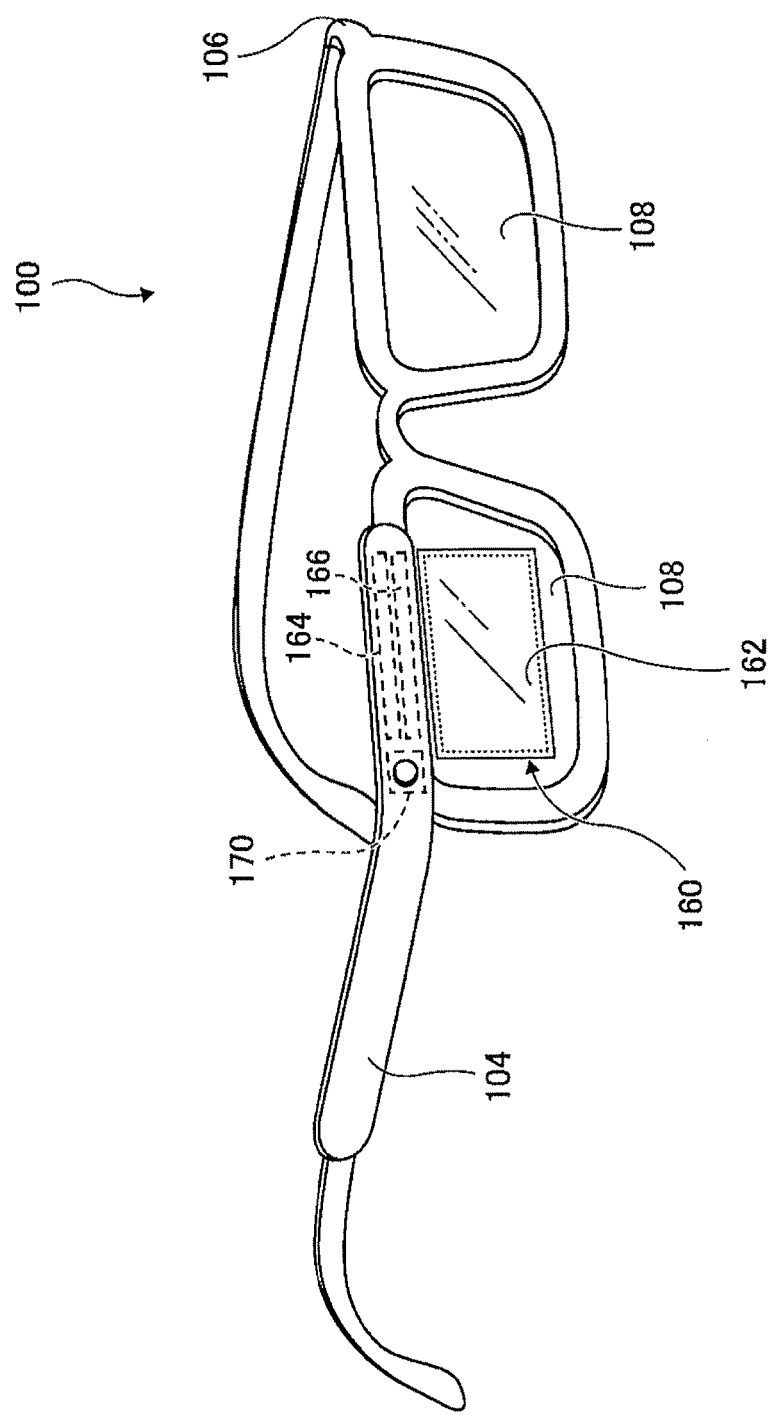
FIG. 22 is a perspective view illustrating a wearable computer used as a terminal device in a data processing system according to a second exemplary embodiment of the present invention.

Next, a second exemplary embodiment of the present invention will be described. FIG. 22 illustrates a terminal device 100 according to the second exemplary embodiment of the present invention. In the first exemplary embodiment, the smart phone is used as the terminal device 100 (see FIG. 3). On the other hand, in the second exemplary embodiment, a glasses type of wearable computer is used as the terminal device 100. For example, the wearable computer forms an image as a 3D hologram, and displays the image formed as the 3D hologram is superimposed on a real image viewed by the operator.

The terminal device 100 includes a housing portion 104, a frame portion 106, and a lens portion 108 as illustrated in FIG. 22. The lens portion 108 is mounted in the frame portion 106, similarly to common glasses. The housing portion 104 is mounted in the frame portion 106 such that the field of view of the operator by the lens portion 108 is not blocked.

The camera apparatus 170 is mounted in the housing portion 104. The control unit 102, the GPS receiving unit 120, the wireless communication unit 130, the acceleration sensor 140, the electronic compass 150, and the memory 180 are installed in the housing portion 104. The GPS receiving unit 120, the wireless communication unit 130, the acceleration sensor 140, the electronic compass 150, and the memory 180 have the same configurations as those in the first exemplary embodiment, and thus a description thereof is omitted.

The terminal device 100 does not include the operating unit 110 such as the touch panel with which the terminal device 100 according to the first exemplary embodiment is equipped. In the terminal device 100, for example, an operation is performed by detecting motion of the hand of the operator and the position information through the camera apparatus 170 and processing the detected motion of the hand and the position information through the control unit 102.

In the terminal device 100 according to the first exemplary embodiment, the LCD panel is used as the display unit 160. On the other hand, in the second exemplary embodiment, a half mirror member 162 is used as the display unit 160. The display unit 160 includes a light emitting element 164 and an optical system 166 along with the half mirror member 162. The light emitting element 164 and the optical system 166 are mounted in the housing portion 104 so that light emitted from the light emitting element 164 forms an image on the half mirror member 162 through the optical system 166.

The half mirror member 162 is formed of a transparent material such as resin or glass. For example, An LCD element or an electroluminescence element may be used as the light emitting element 164. For example, one of optical elements such as a lens and a prism or a combination thereof may be used as the optical system 166.

When no image is displayed on the half mirror member 162, the display unit 160 enters a state in which the half mirror member 162 becomes transparent and transmits light. Thus, the field of view of the operator is not blocked in the state in which no image is displayed on the half mirror member 162.

Figure 23:
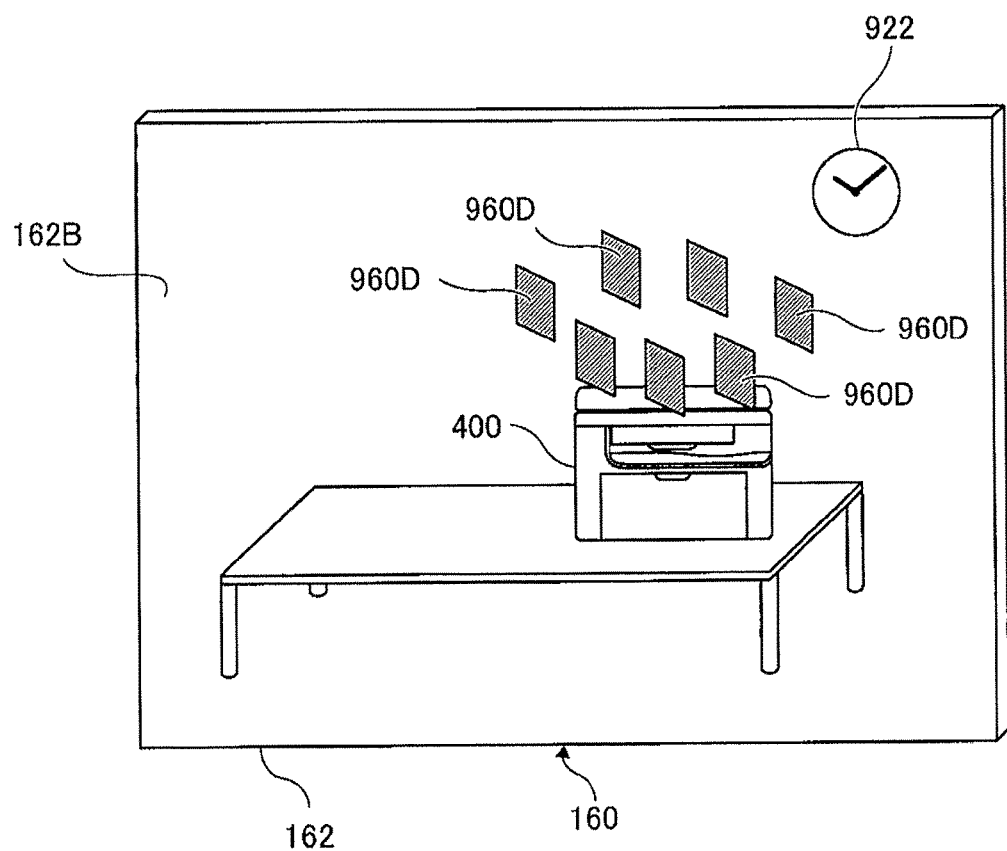
FIG. 23 is a diagram illustrating an example of a request screen displayed on a display unit of the wearable computer illustrated in FIG. 22.

FIG. 23 illustrates a request screen 162B used for requesting the data processing apparatus 400 to process data. As illustrated in FIG. 23, data images 960D indicating data that is requested to be processed are displayed on the request screen 162B so that the operator can view the data images 960D at the same time as the real image of the data processing apparatus 400. In FIG. 23, the data processing apparatus 400 and the clock 922 are the real images which the operator is viewing through the half mirror member 162 and the lens portion 108. On the other hand, the data image 960D is an image that is formed by the optical system 166 using the light emitted from the light emitting element 164 and displayed.

In order for the operator to request the data processing apparatus 400 to process data on the request screen 160B, it is desirable to move the data image 960D indicating the data that is desired to be processed onto the real image of the data processing apparatus 400 through a gesture. The gesture of the operator is recognized by detecting, for example, motion of the hand and the position information of the operator through the camera apparatus 170 and processing the detected motion of the hand and the position information through the control unit 102. Instead of detecting, for example, the motion of the hand and the position information of the operator through the camera apparatus 170, the operator may wear the wearable terminal 810 (see FIGS. 9A and 9B), and the motion of the hand and the position of the operator may be detected by detecting the wearable terminal.

In the terminal device 100 according to the second exemplary embodiment, it is desirable that the data image 960D be not displayed while the operator is moving. Thus, although the operator is moving, it is possible to prevent 3D sickness of the operator that may occur as the data image 960D is displayed.

In the terminal device 100 according to the second exemplary embodiment, it is desirable to cause the data image 960D to be displayed in two or less colors. Thus, it is possible to make it easier for the operator to distinguish, for example, the real image of the data processing apparatus 400 or the clock 922 from the data image 960D than when the data image 960D is displayed in three or more colors.

In the terminal device 100 according to the second exemplary embodiment, it is desirable that the data image 960D be permeably displayed. Thus, it is possible to suppress an adverse effect that when an opaque data image 960D is displayed, the real image is blocked by the data image 960D, and, for example, the real image of the data processing apparatus 400 or the clock 922 is difficult to view.

In the data processing system 10 according to the second exemplary embodiment, a configuration and an operation excluding the above-described configuration and the moving image are the same as those of the data processing system 10 according to the first exemplary embodiment. Thus, a description of the configuration and the operation which are the same as in the first exemplary embodiment is omitted.

Third Exemplary Embodiment

Figure 24:
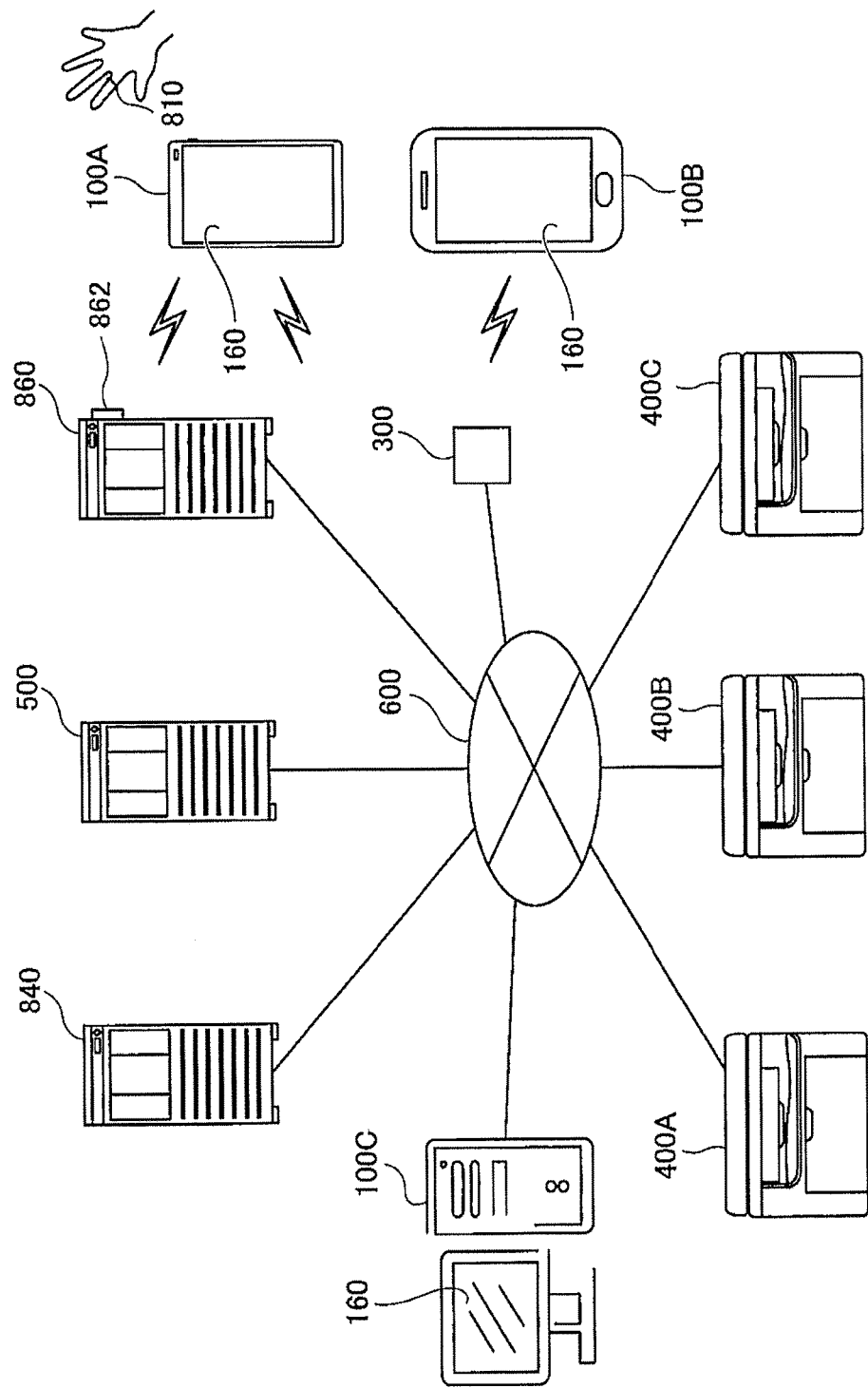
FIG. 24 is a diagram illustrating a data processing system according to a third exemplary embodiment of the present invention.

Next, a third exemplary embodiment of the present invention will be described. FIG. 24 illustrates a data processing system 10 according to the third exemplary embodiment of the present invention. In the first exemplary embodiment, the data processing system 10 includes a terminal device 100, a wireless communication apparatus 300, for example, three data processing apparatuses 400A, 400B, and 400C, and a management apparatus 500 which are connected to a network 600. In addition to these components, the data processing system 10 according to the third exemplary embodiment further includes a data storage apparatus 840 and a gesture delivery apparatus 860, and the data storage apparatus 840 and the gesture delivery apparatus 860 are connected to the network 600.

In the first exemplary embodiment, the example in which one terminal device 100 is connected to the network 600 has been described, but the third exemplary embodiment will be described in connection with an example in which three terminal devices 100A, 100B, and 100C are connected to the network 600. Here, the terminal devices 100A, 100B, and 100C are assumed to differ in a used platform (an operating system (OS)). The third exemplary embodiment will be described in connection with an example in which one operator wearing the wearable terminal 810 (see FIGS. 9A and 9B) operates the terminal device 100A using a gesture, and the terminal devices 100B and 100C are operated by other operators.

The data storage apparatus 840 is a so-called document server and stores data that is requested to be processed by the data processing apparatus 400.

For example, the gesture delivery apparatus 860 delivers the gesture of the operator operating one terminal device, for example, the terminal device 100A to the other terminal devices, for example, the terminal devices 100B and 100C. More specifically, the gesture delivery apparatus includes a detecting apparatus 862 that detects motion and position information of the wearable terminal 810 worn on the operator, and delivers the motion and the position of the wearable terminal 810 detected through the detecting apparatus 862 to the other terminal devices 100B and 100C via the network 600.

In the data processing system 10 according to the third exemplary embodiment, for example, when an operation of designating the processing apparatus image 400I indicating the data processing apparatus 400 that is requested to process data or selecting the data image 960D that is requested to be processed is performed in the terminal device 100A through the gesture, the gesture is delivered to the terminal devices 100B and 100C through the gesture delivery apparatus 860, and thus the operation performed on the terminal device 100A can be displayed on the display units 160 with which the terminal devices 100B and 100C are equipped. In the data processing system 10 according to the third exemplary embodiment described above, the other operators can confirm the operation performed by one operator using one terminal device 100 using the other terminal devices 100.

As described above, the present invention can be applied to a terminal device, a data processing system, and a program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal device comprising:
   a photographing apparatus configured to capture a photograph in a specific direction in which a data processing apparatus is installed;
   a display configured to display a request screen for designating the data processing apparatus to process data, the request screen being configured to display the photograph captured by the photographing apparatus and at least one of:
      (i) data images indicating data that is requested to be processed, and (ii) when an image of the data processing apparatus arranged in the specific direction is not captured in the photograph due to an obstacle positioned between the photographing apparatus and the data processing apparatus, a processing apparatus image indicating the data processing apparatus acquired over a network, the processing apparatus image being a graphical representation of a silhouette of the data processing apparatus, the processing apparatus being superimposed on the photograph captured by the photographing apparatus such that the processing apparatus image and the photograph are entirely visible except a portion of the photograph covered by the silhouette of the data processing apparatus; and a control unit configured to:
  acquire position information of the data processing apparatus;
  acquire the processing apparatus image indicating the data processing apparatus over the network;
  acquire an address of the data processing apparatus on the network; and
  in response to an operation designating the processing apparatus image and one of the data images on the request screen, transmit a request for processing the data indicated by the designated data image to the data processing apparatus indicated by the designated processing apparatus image.

2. The terminal device according to claim 1, wherein:
the display further displays a data designation screen configured to designate the data that is requested to be processed, and
the plural data images are displayed on the data designation screen such that the plural data images are arranged to have a depth in a direction crossing the data designation screen.

3. The terminal device according to claim 1, wherein the operation designating the data image and the processing apparatus image is initiated by causing one of the data images to overlap one of the processing apparatus images.

4. The terminal device according to claim 1, wherein the display does not display the data image while an operator is moving.

5. The terminal device according to claim 1, wherein the display displays the data image in two or less colors.

6. The terminal device according to claim 1, wherein the display displays the data image permeably.

7. A non-transitory computer readable medium storing a program causing a computer to:
  capture a photograph by a photographing apparatus in a specific direction in which a data processing apparatus is installed;
  display a request screen for designating a data processing apparatus to process data, the request screen being configured to display the photograph captured by the photographing apparatus and at least one of:
    (i) data images indicating data that is requested to be processed, and
    (ii) when an image of the data processing apparatus arranged in the specific direction is not captured in the photograph due to an obstacle positioned between the photographing apparatus and the data processing apparatus, a processing apparatus image indicating the data processing apparatus acquired over a network, the processing apparatus image being a graphical representation of a silhouette of the data processing apparatus, the processing apparatus image being superimposed on the photograph captured by the photographing apparatus such that the processing apparatus image and the photograph are entirely visible except a portion of the photograph covered by the silhouette of the data processing apparatus;
  acquire position information of the data processing apparatus;
  acquire the processing apparatus image indicating the data processing apparatus over the network;
  acquire an address of the data processing apparatus on the network; and
  in response to an operation designating the processing apparatus image and one of the data images on the request screen, transmit a request for processing the data indicated by the designated data image to the data processing apparatus indicated by the designated processing apparatus image.

* * * * *